(12) United States Patent
Minamizawa

(10) Patent No.: US 7,965,872 B2
(45) Date of Patent: Jun. 21, 2011

(54) MULTIFUNCTION APPARATUS, MULTIFUNCTION APPARATUS SYSTEM AND NON-TRANSITORY COMPUTER READABLE MEDIUM

(75) Inventor: Fumihiro Minamizawa, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 953 days.

(21) Appl. No.: 11/563,990

(22) Filed: Nov. 28, 2006

(65) Prior Publication Data

US 2007/0122015 A1 May 31, 2007

(30) Foreign Application Priority Data

Nov. 29, 2005 (JP) ................. 2005-344270

(51) Int. Cl.
*G06K 9/00* (2006.01)
(52) U.S. Cl. ...................... 382/115; 382/124
(58) Field of Classification Search .................. 382/115, 382/124
See application file for complete search history.

(56) References Cited

U.S. PATENT DOCUMENTS

| 7,110,578 | B2 | 9/2006 | Nobuhara et al. |
| 2004/0117637 | A1 | 6/2004 | Kanno |

FOREIGN PATENT DOCUMENTS

| JP | 2001296576 | 10/2001 |
| JP | 2002044313 | 2/2002 |
| JP | 2003163762 | 6/2003 |
| JP | 2004037760 | 2/2004 |
| JP | 2004157678 | 6/2004 |
| JP | 2005301844 | 10/2005 |

OTHER PUBLICATIONS

Japanese Office Action-Reference No. AX0541304B, Mailing No. 364878, Mailing Date Jun. 23, 2008.

*Primary Examiner* — Samir A Ahmed
*Assistant Examiner* — Ruiping Li
(74) *Attorney, Agent, or Firm* — Banner & Witcoff, Ltd.

(57) ABSTRACT

A multifunction apparatus that includes: a read unit; a storage unit storing a fingerprint in association with at least one of a function of the multifunction apparatus, a set item and a set value; a call unit that reads from the storage unit at least one of the function, set item and set value associated with the fingerprint read by the read unit; an instruct unit that instructs execution of an operation based on at least one of the function, set item and set value read by the call unit; and an execute unit. When fingerprints are read sequentially by the read unit, the call unit sequentially reads at least one of the function, set item and set value associated with each of the fingerprints, and when the instruct unit instructs the execution, the execute unit executes the operation based on at least one of the thus read function, set item and set value.

29 Claims, 20 Drawing Sheets

FIG. 5A

SELECT FUNCTION
[COPY] [PRINT]
[FAX] [SCANNER]
[TO NEXT]
[SELECT] [RETURN]

FIG. 5B

"COPY" IS SELECTED
REGISTER FINGERPRINT

[READ] [RETURN]

FIG. 5C

"COPY" HAS BEEN RREGISTERED
REPLACE DATA ?

[YES] [NO]

FIG. 5D

REGISTRATION OF "COPY" IS COMPLETED
CONTINUE REGISTRATION ?

[YES] [NO]

FIG. 5E

SELECT "COPY" SET ITEM
[COLOR] [MONOCHROME]
[SOLID RED] [SOLID BLUE]
[TO NEXT]
[SELECT] [RETURN]

FIG. 6A

| USER ID | PASSWORD | FUNCTION | FINGERPRINT DATA | SET VALUE 1 | FINGERPRINT DATA | SET VALUE 2 | FINGERPRINT DATA |
|---|---|---|---|---|---|---|---|
| USER A | pass A | COPY | RIGHT HAND INDEX FINGER | MONO-CHROME | RIGHT HAND INDEX FINGER | ONE SIDE | RIGHT HAND INDEX FINGER |
| | | | | | | BOTH SIDE | RIGHT HAND MIDDLE FINGER |
| | | | | | | 2in1 | RIGHT HAND THIRD FINGER |
| | | | | | | ⋮ | ⋮ |
| | | | | COLOR | RIGHT HAND MIDDLE FINGER | ⋮ | ⋮ |
| | | | | | | ⋮ | ⋮ |
| | | | | SOLID RED | RIGHT HAND THIRD FINGER | ⋮ | ⋮ |
| | | | | | | ⋮ | ⋮ |
| | | | | ⋮ | ⋮ | ⋮ | ⋮ |
| | | FAX | RIGHT HAND MIDDLE FINGER | SET ITEM 1 | FINGERPRINT DATA | SET VALUE 1 | FINGERPRINT DATA |
| | | | | RESOLUTION | RIGHT HAND INDEX FINGER | ROUGH | RIGHT HAND INDEX FINGER |
| | | | | | | STANDARD | RIGHT HAND MIDDLE FINGER |
| | | | | | | DETAIL | RIGHT HAND THIRD FINGER |
| | | | | | | ⋮ | ⋮ |
| | | | | TELEPHONE DIRECTORY | RIGHT HAND MIDDLE FINGER | DESTINATION 1 | RIGHT HAND INDEX FINGER |
| | | | | | | ⋮ | ⋮ |
| | | | | ⋮ | ⋮ | ⋮ | ⋮ |
| | | ⋮ | ⋮ | ⋮ | ⋮ | ⋮ | ⋮ |
| USER B | pass B | ⋮ | ⋮ | ⋮ | ⋮ | ⋮ | ⋮ |
| ⋮ | ⋮ | | | | | | |

FIG. 6B

| FINGERPRINT DATA | DATE OF REGISTRATION | NUMBER OF TIMES OF ERRORS | UPDATE TIMING FLAG |
|---|---|---|---|
| RIGHT HAND INDEX FINGER | OCTOBER 19, 2005 | 1 | 0 |
| RIGHT HAND MIDDLE FINGER | OCTOBER 19, 2005 | 0 | 0 |
| RIGHT HAND THIRD FINGER | OCTOBER 19, 2005 | 2 | 0 |
| ⋮ | ⋮ | ⋮ | ⋮ |

FIG. 7A

SELECT NUMBER

| 1 | 2 | 3 | A |
| 4 | 5 | 6 | B |
| 7 | 8 | 9 | C |
| * | 0 | # | D |

SELECT
RETURN

FIG. 7B

"1" IS SELECTED
REGISTER FINGERPRINT

READ  RETURN

FIG. 7C

"1" HAS BEEN REGISTERED
REPLACE DATA ?

YES  NO

FIG. 7D

REGISTRATION OF "1" IS COMPLETED
CONTINUE REGISTRATION ?

YES  NO

FIG. 8

| USER ID | PASSWORD | KEY NAME | FINGERPRINT DATA | DATE OF REGISTRATION | NUMBER OF TIMES OF ERRORS | UPDATE TIMING FLAG |
|---|---|---|---|---|---|---|
| USER A | pass A | 1 | RIGHT HAND INDEX FINGER | OCTOBER 19, 2005 | 1 | 0 |
| | | 2 | RIGHT HAND MIDDLE FINGER | OCTOBER 19, 2005 | 0 | 0 |
| | | 3 | RIGHT HAND THIRD FINGER | OCTOBER 19, 2005 | 2 | 0 |
| | | ⋮ | ⋮ | ⋮ | ⋮ | ⋮ |
| | | A | RIGHT HAND INDEX FINGER | OCTOBER 21, 2005 | 0 | 0 |
| | | B | RIGHT HAND MIDDLE FINGER | OCTOBER 21, 2005 | 0 | 0 |
| | | C | RIGHT HAND THIRD FINGER | OCTOBER 21, 2005 | 0 | 0 |
| | | ⋮ | ⋮ | ⋮ | ⋮ | ⋮ |
| USER B | pass B | 1 | RIGHT HAND INDEX FINGER | ⋮ | ⋮ | ⋮ |
| | | ⋮ | ⋮ | ⋮ | ⋮ | ⋮ |
| ⋮ | ⋮ | ⋮ | ⋮ | ⋮ | ⋮ | ⋮ |

FIG. 9

| FIRST HIERARCHY | | SECOND HIERARCHY | | THIRD HIERARCHY | | ... |
|---|---|---|---|---|---|---|
| 1 | COPY | 1 | MONOCHROME | 1 | ONE SIDE | ⋮ |
| | | | | 2 | BOTH SIDE | ⋮ |
| | | | | 3 | 2in1 | ⋮ |
| | | | | 4 | 4in1 | ⋮ |
| | | 2 | COLOR | ⋮ | ⋮ | ⋮ |
| | | 3 | SOLID RED | ⋮ | ⋮ | ⋮ |
| | | 4 | SOLID BLUE | ⋮ | ⋮ | ⋮ |
| | | ⋮ | ⋮ | ⋮ | ⋮ | ⋮ |
| 2 | FAX | 1 | RESOLUTION | 1 | ROUGH | ⋮ |
| | | | | 2 | NORMAL | ⋮ |
| | | | | 3 | DETAILED | ⋮ |
| | | 2 | TELEPHONE DIRECTORY | 1 | DESTINATION 1 | ⋮ |
| | | | | 2 | DESTINATION 2 | ⋮ |
| | | | | 3 | DESTINATION 3 | ⋮ |
| | | ⋮ | ⋮ | ⋮ | ⋮ | ⋮ |
| ⋮ | ⋮ | ⋮ | ⋮ | ⋮ | ⋮ | ⋮ |

FIG. 10

| user A | REGISTRATION CONTENTS |
|---|---|
| RIGHT HAND THUMB | MENU |
| RIGHT HAND INDEX FINGER | COPY |
| RIGHT HAND MIDDLE FINGER | FAX |
| RIGHT HAND THIRD FINGER | SCANNER |

⋮

FIG. 11 user A    REGISTRATION CONTENTS

| 1 | RIGHT HAND INDEX FINGER |
| 2 | RIGHT HAND MIDDLE FINGER |
| 3 | RIGHT HAND THIRD FINGER |

MULTIFUNCTION APPARATUS, MULTIFUNCTION APPARATUS SYSTEM AND NON-TRANSITORY COMPUTER READABLE MEDIUM

CROSS-REFERENCE TO RELATED APPLICATION

This application claims priority from Japanese Patent Application No. 2005-344270, filed on Nov. 29, 2005, the entire subject matter of which is incorporated herein by reference.

TECHNICAL FIELD

Aspects of the present invention relate to a multifunction apparatus including a copying function, a printing function, a facsimile function and the like, a multifunction apparatus system, and a computer program product.

BACKGROUND

A multifunction apparatus including several functions is operated such that one function is chosen and then various parameters corresponding to the chosen function are set, whereby the apparatus carries out a desired action. As the multifunction apparatus becomes increasingly sophisticated and the number of functions thereof is increased, the above-mentioned operation has become complicated.

In view of the circumstances, there have been developed an image processing apparatus and an image processing method in which the complicated setting of the functions and parameters, which requires a user to operate plural keys, is previously registered in the apparatus in association with a fingerprint of the user, and the user allows the apparatus to read user's fingerprint to thereby read out the registered setting (see JP-A-2002-044313). According to such a configuration, without carrying out the complicated operation, the desired action can be executed simply by allowing the apparatus to read the user's fingerprint.

SUMMARY

According to the configuration disclosed in JP-A-2002-044313, the complicated combinations for the settings of plural functions and parameters requiring the user to operate plural keys are registered in the apparatus in such a manner that they are associated with a fingerprint in a batch. In this case, the setting of the functions and parameters can be simply executed according to the registered contents, and user authentication is also possible. One combination of the complicated function and the parameter setting is registered for each of the registered fingerprints obtained from plural fingers. Owing to this, one user is not allowed to register many combinations. Also, when executing a combination of a function and parameter setting, which is partly different from the registered combination, the key operation must be carried out. Thus, the apparatus disclosed in JP-A-2002-044313 is not sufficient in view of applicability and convenience for a user.

Aspects of the invention provide a multifunction apparatus, which can provide high applicability and can execute complicated settings of functions and parameters simply using a fingerprint, a multifunction apparatus system and a computer program.

BRIEF DESCRIPTION OF THE DRAWINGS

FIGS. 5A to 5E are views showing an example of screens to be displayed after the screen shown in FIG. 4 for registration of the fingerprint data;

FIGS. 6A and 6B are views showing an example of registration contents in a fingerprint data storage area for storing the registered fingerprint data corresponding to functions, set items or set values;

FIGS. 7A to 7D are views showing an example of display screens used to register fingerprint data corresponding to code information;

FIG. 8 is a view showing an example of the registration contents of the fingerprint data storage area corresponding to code information;

FIG. 9 is an explanatory view showing a hierarchy structure for functions, set items and set values;

FIG. 10 is a view showing an example of a display screen for displaying fingerprint data registration contents corresponding to functions, or set items and their associated set values;

FIG. 11 is a view showing an example of a display screen for displaying fingerprint data registration contents corresponding to code information;

FIG. 22 is a view showing an example of a display screen of the terminal apparatus.

DETAILED DESCRIPTION

Figure 1:
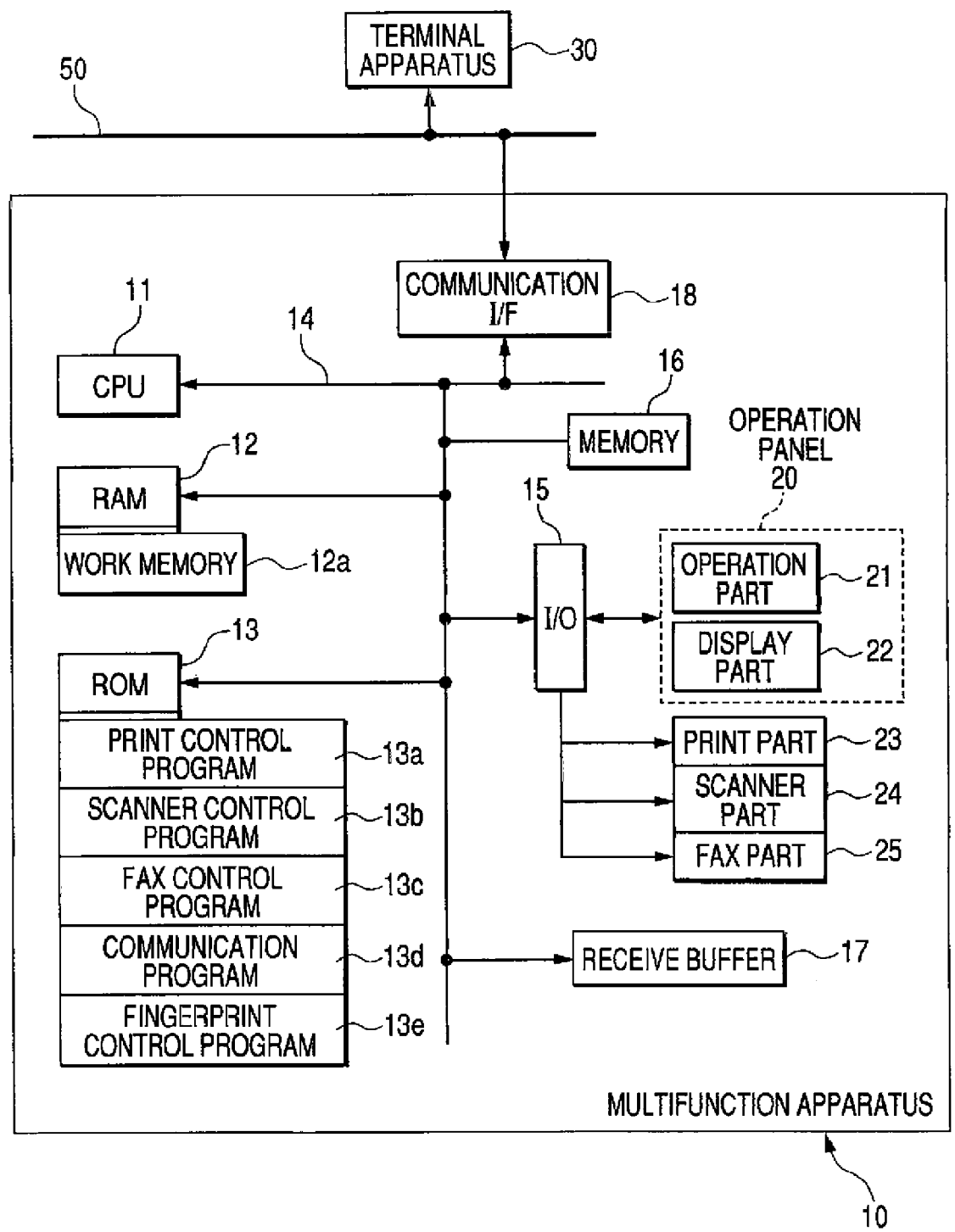
FIG. 1 is a block diagram showing a multifunction apparatus and a multifunction apparatus system.

Now, description will be given below of an aspect of the invention while taking a multifunction apparatus as an example. FIG. 1 is a block diagram of the electric structure of a multifunction apparatus 10. The multifunction apparatus 10 comprises a CPU 11; a RAM 12 including a work memory 12a; a ROM 13 for storing various programs; a bus line 14; an input/output part 15; a memory 16; a communication interface 18; and a receiving buffer 17 for temporarily storing received data such as print control data.

In the ROM 13, there are stored a print control program 13a, a scanner control program 13b, a FAX control program 13c, a communication program 13d, and a fingerprint control program 13e.

To the input/output part 15, there are connected an operation panel 20 (see FIG. 2, the details of which will be discussed later); a print part 23 composed of a known ink jet print mechanism, a laser print mechanism, a thermal transfer print mechanism, a dot impact type print mechanism or the like; a scanner part 24 which includes an image sensor and is used to read a document; a FAX part 25 which includes a FAX modem and the like and is used to carry out FAX communication. The operations of these print part 23, scanner part 24 and FAX part are well known and are controlled by the CPU 11 in such a manner that the CPU 11 executes their corresponding print control program 13a, scanner control program 13b and FAX control program 13c respectively stored in the ROM 13 using the work memory 12a of the RAM 12, while the CPU 11 functioning as a call unit, an instruct unit, an execute unit, a first determination unit, a registration mode transfer unit, a second determination unit, an operation mode transfer unit, a timing generate unit, an update request unit, an error count record unit and a period measure unit.

Also, the communication interface 18, which functions as an information obtain unit, comprises a communication interface circuit for transmitting and receiving data or the like to and from a terminal apparatus 30 (the details of which will be discussed later) through a communication network 50 such as a LAN (Local Area Network) or the like. Transmission and reception of various data through an external communication network connected to the communication network 50 are carried out by the CPU 11 executing the communication program 13d.

The memory 16, which also functions as a storage unit, a first storage unit and a second storage unit, is composed of a nonvolatile memory such as an EEPROM (Electrically Erasable & Programmable Read Only Memory) or the like. In the memory 16, there is stored a telephone directory in which, for example, names of persons, names of companies and the like are listed with their respective destination information such as their respective telephone numbers and the like added thereto. Facsimile transmission can be executed to a desired telephone number using this telephone directory.

Figure 2:
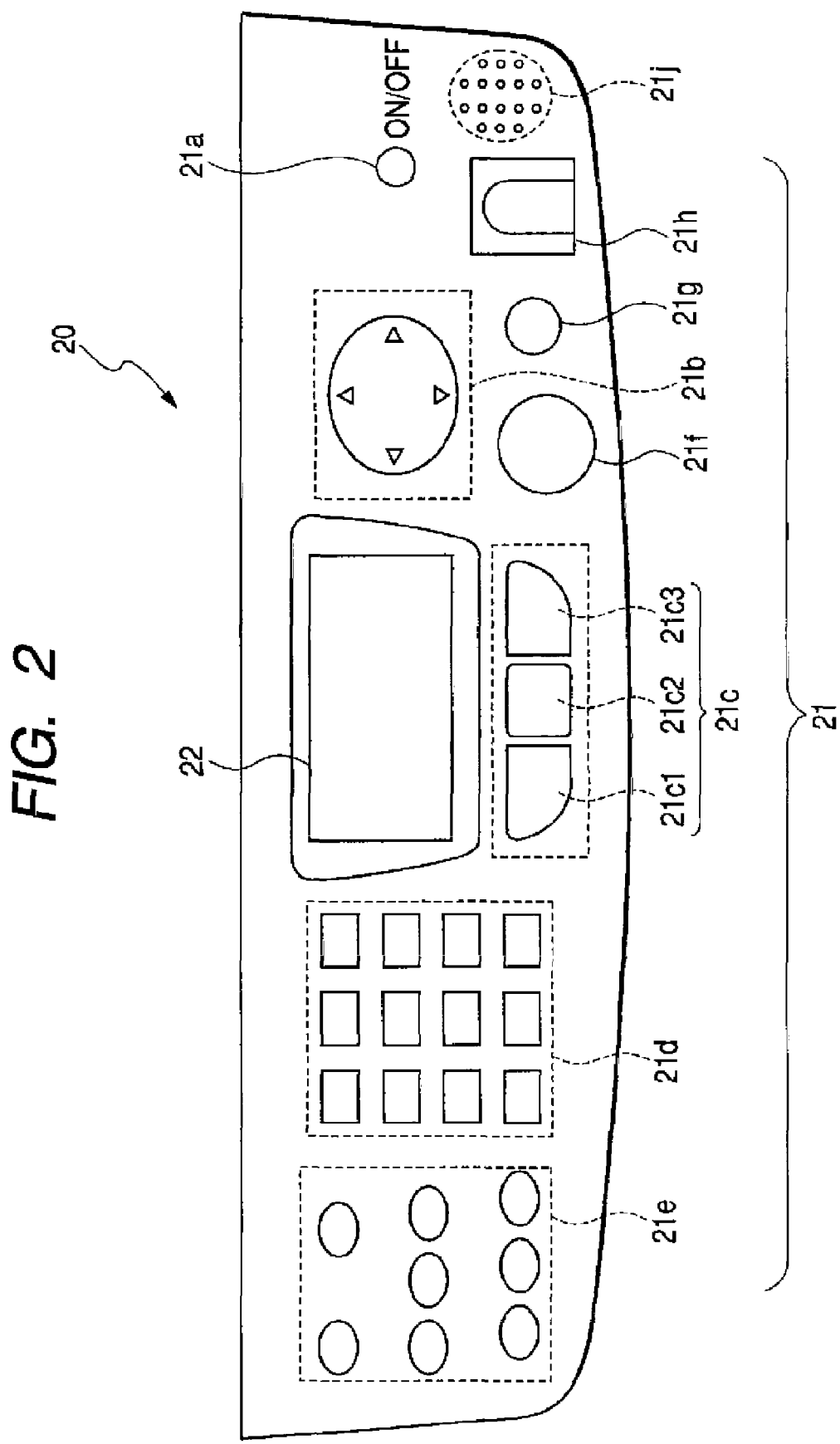
FIG. 2 is a plan view showing an operation panel.

FIG. 2 shows an example of the operation panel 20 of the multifunction apparatus 10. The operation panel 20 comprises an operation part 21, which functions as a designate unit and a registration unit, and a display part 22. In the operation part 21, there are used mechanical keys. Specifically, the operation part 21 includes: a power button 21a for turning on/off of a power supply of the multifunction apparatus; a cursor key 21b; a function selection button pad 21c including a copy button 21c1, a FAX button 21c2 and a scanner button 21c3; a numeric keypad 21d; a one-touch button pad 21e through which various pieces of information such as telephone numbers, FAX numbers and the like are registered; a start button 21f which functions as an instruct unit for starting various operations; a stop button 21g for interrupting or stopping various operations; a fingerprint read device 21h; and a speaker 21j.

The fingerprint read device 21h, which functions as a read unit, is used to confirm the identification of a user using a fingerprint according to a well-known fingerprint recognition technology. A fingerprint reading method includes: a method for distinguishing the uneven portion of a fingerprint from the amount of electric charges detected by a semiconductor sensor to convert it into an image; and a method for distinguishing the uneven portion of a fingerprint from the state of the reflected light radiated onto and reflected from the fingerprint to convert it to an image. From the read fingerprint image, there are extracted characteristic points which represent the characteristics of the pattern of the fingerprints for example, a central point which is the center of the fingerprint pattern, a branch point which is the branch-off portion of the projecting pattern of the fingerprint, an end point which is the terminal of the fingerprint projecting pattern, and, a delta which is a gathering point from three directions. These characteristic points are then converted to data and registered in a database. In recognition, the kind of the characteristic points, the direction of the characteristic points and coordinates from the central point of the characteristic points of the fingerprint data to be recognized are compared with those of the registered fingerprint data; and, when the comparison result level exceeds a given determination level, it is determined that both of the fingerprints coincide with each other (that is, the user having put his or her fingerprint on the fingerprint device is confirmed to be identified).

The display part 22, which functions as a registration content display unit and a registration content confirm unit, comprises a color liquid crystal display device of a well-known dot matrix type and a driver circuit (not shown) for controlling the liquid crystal display device. The driver circuit uses an active matrix drive method which applies transistors each for an image and can turn on or off a target image positively. The driver circuit can execute a display operation according to a display instruction given from the input/output part 15 or according to the display screen data. Also, as the display part 22, there may also be used an organic EL (ElectroLuminescence) display device or a plasma display device.

Also, as the operation part 21, there may also be used a touch panel which is formed integrally with the display part 22. As the touch panel, there is widely used a so-called resistance film type touch panel. In this type touch panel, on the screen of the display part 22, more specifically, on a glass substrate and a transparent film, there are arranged electric circuits through a clearance called a spacer in the X-axis and Y-axis directions; and, when a user touches the film, the wiring of the portion of the circuit depressed by the user is shorted to thereby vary the voltage value, and the varied voltage value is detected as two-dimensional coordinate values (X, Y). Besides this, there may also be used a so-called electrostatic capacity type touch panel.

(Fingerprint Data Registration Processing 1)

Now, description will be given below of a fingerprint data registration processing for registering a fingerprint in association with a function, a set item or a set value with reference to FIGS. 3 to 5. By the way, the present processing is contained in the fingerprint control program 13e and is repeatedly executed together with the remaining processings of the fingerprint control program 13e. Also, the registration of the fingerprint data is allowed on condition that an administrator inputs a password or the like for security. Firstly, by operating the cursor key 21b or the like of the operation part 21, a user inputs a user ID (description will be given by taking a user A) and a password on an initial screen (not shown). The user A then selects a fingerprint registration menu and allows the display part 22 to display a fingerprint registration menu screen as shown in FIG. 4 (S1).

When the user A presses down a "registration" button on the fingerprint registration screen, there is shown a function select screen as shown in FIG. 5A. Here, for example, when the user A depresses a "copy" button and a "select" button in this order to select a copy function (S2), a screen shown in FIG. 5B is displayed; and then, the user A places a finger to be registered on the fingerprint read device 21h, for example, the "index finger of a right hand" and depresses the "read" button to thereby read the fingerprint (S3). Although not shown in FIG. 5B, a finger to be registered is designated. The choices, such as a right hand thumb, a right hand index finger, and a right hand middle finger are displayed and, by selecting and designating one of them using a cursor, the name of the finger is designated. When the name of the finger is designated, the fingerprint is read correctly and the characteristic points of the fingerprint are converted to data, a fingerprint data storage area, which is secured in the memory 16, is referred to check whether the user A's fingerprint data have already been registered with respect to the present function or not.

When the fingerprint data of the user A are found to be registered (S4: Yes), there is displayed a screen as shown in FIG. 5C, and it is selected whether the fingerprint data are replaced or not. On the screen shown in FIG. 5C, when the "Yes" button is depressed (S7: Yes), the newly registered fingerprint data (name: right hand index finger) are registered in a storage area corresponding to the "copy" of the user A (S5). On completion of the registration, there is displayed a screen shown in FIG. 5D and thus, when the user A wants to register another function or another set item (S6: Yes), the user A depresses the "Yes" button to repeat the processings in the above-mentioned steps S2 to S6.

When registering fingerprint data corresponding to the set value of a set item situated in the lower layer of the function (which corresponds to a second hierarchy), if the buttons "copy" and "next" are depressed sequentially on the display screen of FIG. 5A, then there is displayed a screen as shown in FIG. 5E for selecting the set value of a set item relating to a copy function. For copy, firstly, there exists "color" as the set item and, according to the present aspect, as such set values, there are prepared "monochrome", "color", "solid red" and "solid blue". Of these set values, a button for a set value to be fingerprint registered is depressed and a "select" button is then depressed; and then, similarly to the above-mentioned description, the fingerprint is read and registered. When the user A also wants to register the fingerprint for another color as well, on the same screen, after a button for another set value is depressed, the "select" button may be depressed, thereby registering the fingerprint similarly.

Further, as the set item for a lower layer (a third hierarchy), there exists, for example, "copy type" and, as the set value for this, there are prepared, for example, "one side", "both sides", "2 in 1" and "4 in 1". In this case as well, when a button "to next" is depressed on the screen shown in FIG. 5E, there is displayed a screen for selection of a next hierarchy (not shown); and, when the set value to be registered is selected using the "select" button to read the fingerprint, the fingerprint can be registered. By the way, as the other set item, there may be prepared a "copy shade" item, a "number of copies" item or a "tray" item. The number of copies can be registered as a set value after the number of copies to be desired by the user is designated.

FIG. 6A shows an example of the registration contents, in which functions or set values of set items are associated with fingerprint data. In the registration data, there is provided storage areas for the respective users, in which there are registered user IDs, passwords, functions, fingerprint data corresponding to functions, set values corresponding to set items, and fingerprint data respectively corresponding to their associated set values.

In the example shown in FIG. 6A, there are shown the registration contents of the user A. Specifically, for the copy function, there are registered the fingerprint data on the "right hand index finger" and, for the FAX function, there are registered the fingerprint data on the "right hand middle finger", respectively. Also, as the set value 1 for the set item "color" of the copy function, there are registered the fingerprint data on the "right hand index finger" for "monochrome", the fingerprint data on the "right hand middle finger" for "color", and the fingerprint data on the "right hand third finger" for "solid red", respectively. Further, as the set values 2 for the set item "copy type" in the lower layer, there are registered the fingerprint data on "right hand index finger" for "one side", the fingerprints on "right hand middle finger" for "both sides", and the fingerprint data on the "right hand third finger" for "2 in 1", respectively.

As for the FAX function, as the set item thereof (which corresponds to a second hierarchy), there are registered the "resolution setting" and the "telephone directory selection" in such a manner that they are made to correspond to the fingerprint data; and, as the set value 1 (which corresponds to a third hierarchy) set in the lower layer of the "resolution setting", there exist "rough", "standard" and "detail" which are registered in association with the fingerprint data respectively.

Here, the relationship between the set items and set values varies from function to function. That is, in the copy function, the set value exists in the lower layer next to the layer of the function. In the FAX function, the set item exists in the lower layer of the function. Basically, the set value is a factor which, when it is designated, can determine one operation as to the function. For example, for the copy function, "monochrome" and "color" are set values and, when the contents of the set values are designated, it is determined that the operation of the "copy" is a monochrome copy or a color copy. On the other hand, as for the set item, the operation of the function cannot be determined by only designating the set item. The operation of the function can be determined only when a set value existing in the next lower layer of the set item is designated. For example, even if the "resolution" is designated in the FAX function, the operation of the FAX function cannot be determined. In this case, both of the set item and set value must be designated.

Also, of the data shown in FIG. 6A, at least the fingerprint data may be preferably registered in such a manner that they are encrypted according to a well-known encrypt technology which uses a key of cryptograph and an encryption algorithm. By the way, in such encryption, for example, the fingerprint data are divided into blocks each of a given length and each block, which is data having a given bit length, is encrypted using a key of cryptograph. As the encryption algorithm, for example, there is known an algorithm in which the block is divided into two front and rear blocks, one block 1 is shifted using a key of cryptograph, there is obtained an exclusive-OR between the thus shifted block and the other block 2 to provide a new block 2, and an operation to replace the contents of the block 1 with the contents of the new block 2 is repeated a given number of times.

Further, the registration days of the registered fingerprint data on the user A (the details of which will be discussed later), the number of times of errors for fingerprint recognition (the details of which will be discussed later) and the like are registered as shown in FIG. 6B.

As in the case of the copy function, since the function, the set value 1 of a set item corresponding to the function and the set value 2 thereof have a hierarchical relationship between them and thus they are never displayed simultaneously on the display part 22. Thus, they can be registered using the same fingerprint data. Therefore, a relatively large number of set items and set values can be associated with the limited number of fingerprint data. Also, the user, whose fingerprint data are registered, is allowed to use the multifunction apparatus 10, thereby being able to maintain the security of the multifunction apparatus 10.

(Fingerprint Data Registering Processing 2)

Now, description will be given below of a fingerprint data registering processing for registering fingerprint data corresponding to coded information with reference to FIGS. 3, 4 and 7A to 7D. By the way, the present processing is included in the fingerprint control program 13e, and is executed repeatedly together with the other remaining processings of the fingerprint control program 13. The present processing requires the identification of an administrator using a password or the like in order to keep the security of the processing. Similarly to the fingerprint data registering processing 1, when the user A selects the fingerprint registration menu and depresses the "registration" button arranged in the "code" line on the fingerprint registration menu screen shown in FIG. 4, there is displayed such a code select screen as shown in FIG. 7A. Here, for example, when buttons "1" and "select" are depressed sequentially (S2), there is displayed a screen shown in FIG. 7B and thus the user A may put his or her finger to be registered on the fingerprint read device 21h and depresses the "read" button to thereby read the fingerprint (S3). By the way, although not shown in FIG. 7B, here, the finger to be registered is designated. For example, there are displayed the choices such as a right hand thumb, a right hand index finger, a middle finger. By selecting one of them using a cursor and determining and inputting the selected finger, the name of the finger can be designated. When the fingerprint of the finger is read correctly and the characteristic points thereof are extracted and processed as data, the fingerprint data storage area, which is secured in the memory 16, is referred to check whether the fingerprint data of the user A have already been registered with respect to the present code or not.

When the fingerprint data are found to be registered (S4: Yes), there is displayed such a screen as shown in FIG. 7C to ask whether to replace the fingerprint data. When a "Yes" button is depressed on the screen shown in FIG. 7C (S7: Yes), the fingerprint data (right hand index finger) are registered in the storage area corresponding to the "1" of the user A (S5). On completion of the registration, there is displayed a screen shown in FIG. 7D and thus, when the user A wants to register another code (S6: Yes), the user A may press down the "Yes" button and repeats the processings in the steps S2 to S6.

FIG. 8 shows an example of the registration contents of the fingerprint data storage area corresponding to the code information. For the registration data, in the memory 16, there are provided storage areas respectively corresponding to the respective users, in each of which there are registered a user ID, a password, a code (a key name), fingerprint data corresponding to the code, the dates of registration of the fingerprint data (the details of which will be discussed later), the number or times of occurrence of errors in fingerprint recognition (the details of which will be discussed later), and the like. Also, of these data, at least the fingerprint data are registered using a well-known encryption technology in a state where they are encrypted.

In the examples shown in FIGS. 7A to 7D and 8, as the code, there can be selected "numerals" and "alphabet". For the "numerals" and "alphabet", the fingerprint data of the same finger can be registered. The reason for this is as follows. That is, normally, when the functions, set items or set values are designated, the same kinds of codes are given to the choices existing in the same hierarchy; for example, as the choices when selecting the functions, there are used letters A, B, and C and, as the choices for the set values of the set items existing in the lower layer of the function, there are used 1, 2 and 3. Thus, even when the same fingerprint data are registered in both numerals and alphabet, there is no fear that they can be confused or can be incorrectly designated. Therefore, a relatively large number of pieces of code information can be associated with the limited number of fingerprint data, to thereby spread the range of functions, set items or set values which can be designated using fingerprints. Also, since the associated pieces of code information are associated with the respective fingerprints, there can also be provided an effect that it is easy for an operator to learn the setting of the set items and set values.

FIG. 9 shows an example using the numerals in which the respective pieces of code information are allocated to the functions, set items or set values. These numerals are stored in a code information storage area secured in the memory 16. The first hierarchy, which corresponds to the upper-most layer, is a hierarchy for the functions. In the first hierarchy, there are set functions in such a manner that they correspond to the respective numerals. In the second hierarchy and its following hierarchies which are respectively arranged below the first hierarchy, there are set the set items and set values that respectively correspond to the function of the first hierarchy as well as correspond to the numerals.

(Confirmation of Registered Contents)

In a state where the processing is transferred to an operation mode according to the user ID of the user A, it is also possible to confirm the contents that have been registered by the user A. When the "confirmation" button arranged in the line of the "function" is depressed on the fingerprint registration menu shown in FIG. 4, as shown in FIG. 10, there are displayed on the display part 22 the registration contents of the fingerprint data corresponding to the function or set item of the user. Also, when the "confirmation" button in the line of the "code" is pressed down, as shown in FIG. 11, there are displayed on the display part 22 the registration contents of the fingerprint data corresponding to the code information of the user A. By the way, when the registration contents cannot be displayed on one screen, the display may be switched by operating the cursor key 21b to thereby be able to confirm the whole registration contents. In this manner, even when the user A happens to forget the registration contents that are associated with the user's fingerprint, the registration contents can be confirmed easily.

(Transfer to a Fingerprint Mode)

Figure 12:
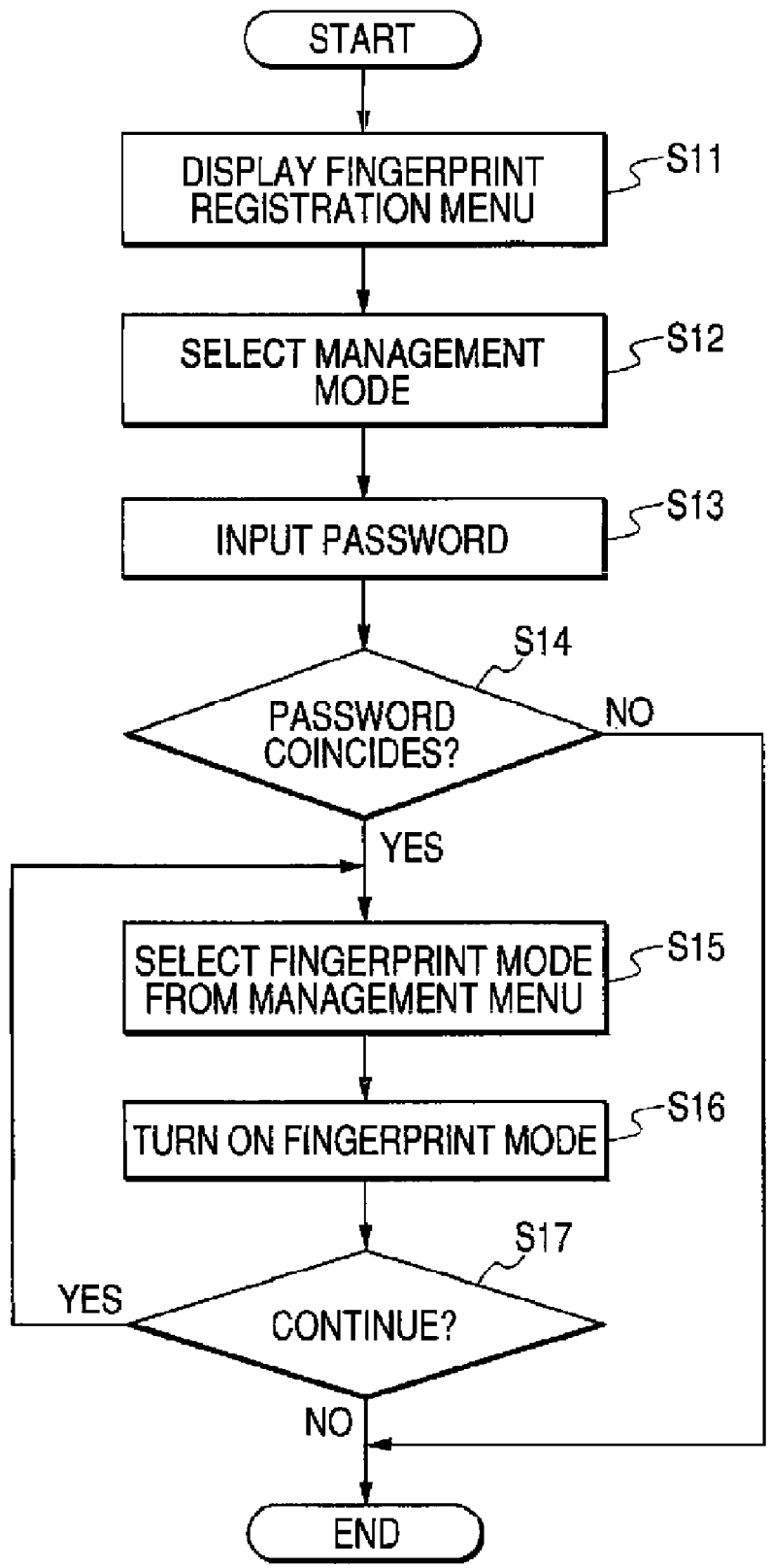
FIG. 12 is a flow chart showing a mode setting processing.
Figure 13A:
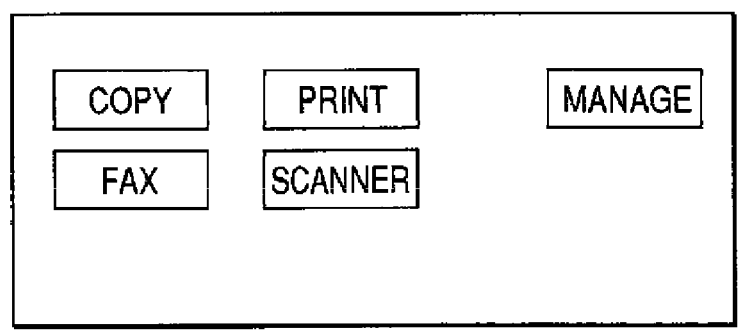
FIGS. 13A to 13E are views showing an example of display screens used to execute the mode setting processing.

Now, description will be given below of a mode setting processing for transferring the processing to a fingerprint mode, which allows the execution of an operation using the fingerprint data with reference to FIGS. 12 and 13. By the way, the present processing is included in the fingerprint control program 13e, it is executed repeatedly together with the other remaining processings of the fingerprint control program 13e, and it requires the identification of an administrator using a password or the like in order to ensure the security of the processing. Firstly, by operating the cursor key 21b or the like of the operation part 21, there is displayed on the display part 22 such a fingerprint registration menu as shown in FIG. 13A (S11), and, by depressing the "management" button, there is selected a management mode (S12).

Figure 13B:
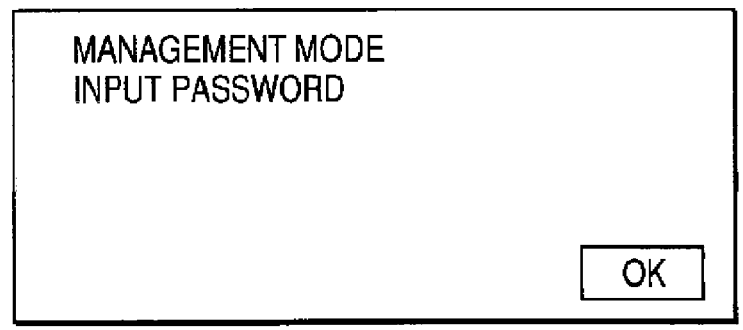

On selecting the management mode, there is displayed such a password input screen as shown in FIG. 13B and thus, by operating the numeric keypad 21d or the like, there is input a password for a management mode (S13). As for the password for a management mode, the initial data thereof are previously stored in the memory 16 when the multifunction apparatus 10 is shipped from the factory but the initial data can also be changed by a user who has the right to manage the password.

Figure 13C:
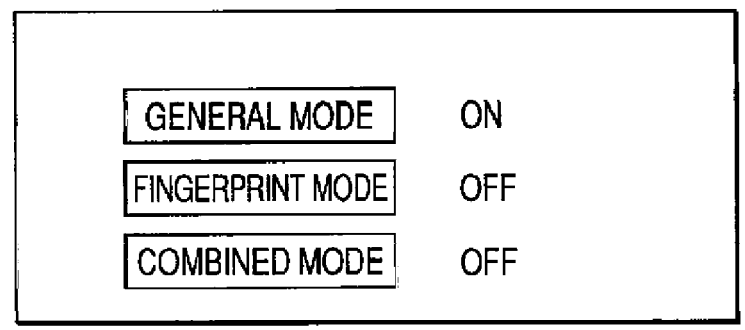
Figure 13D:
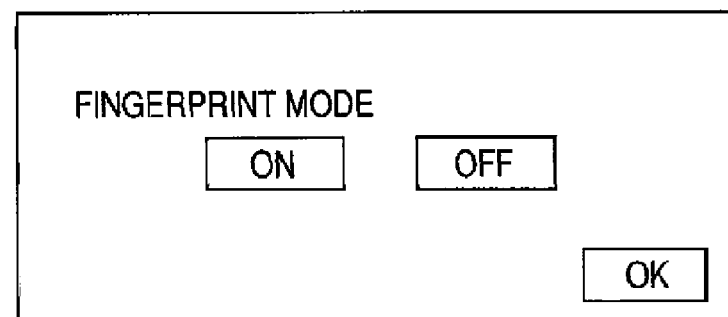

When the thus input password is found to coincide with the initially stored password (S14: Yes), there is displayed such a management menu as shown in FIG. 13C and thus the "fingerprint mode" button is depressed (S15). In the example shown in FIG. 13C, the fingerprint mode is held in an off (invalid) state. And, when a screen shown in FIG. 13D is shown, the "ON" and "OK" buttons are pressed down sequentially to thereby switch the fingerprint mode over to an on (valid) state (S16). The thus set contents are stored in the memory 16.

Figure 13E:
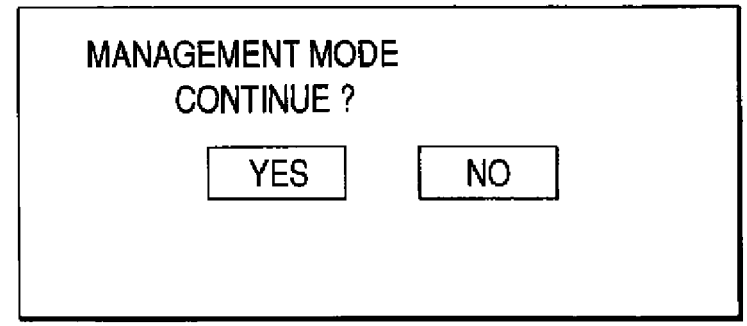

After then, since a screen shown in FIG. 13E is displayed, when the "OK" button is depressed (S17: Yes), the management mode is allowed to continue, whereas the "NO" button is depressed (S17: No), the management mode is caused to end.

Incidentally, "a general mode" is a mode which allows an operation only by using the keys of the operation part 21 but prohibits an operation by using the fingerprint data; and, "a combined mode" is a mode which allows an operation not only by using of the keys of the operation part 21 but also by using the fingerprint data.

Also, there may also be employed a method which changes the operation mode according to time periods. The change of the operation mode is executed according to the management menu: that is, a time period may be input and a mode to be operated in the input time period may be selected. For example, at night (22:00 to 06:00), the multifunction apparatus 10 maybe set such that it can be operated only in the fingerprint mode. Since such setting is possible, at night, undesignated persons are prevented from using the multifunction apparatus 10, which makes it possible to ensure the security of the multifunction apparatus 10.

Also, as a method for obtaining data on the registration date and time when the fingerprint data are registered as well as data on the date and time used in the time period for changing the operation mode in FIGS. 6B and 8, there are available the following methods. Since the CPU 11 includes a counter function, the date and time data can be obtained based on the count cycle of the counter. The initial values of the data and time data are set when the multifunction apparatus 10 is shipped from the factory. Also, instead of the CPU 11, there may also be used a well-known clock IC which has a clock function. Further, the date and time data may also be obtained from other equipment through the communication network 50.

(Fingerprint Mode Operation 1)

Now, description will be given below of an operation processing to be executed using the fingerprint data corresponding to the functions, set items or set values with reference to FIGS. 14, 15 and 16A to 16F. The present operation processing is executed in a state where the fingerprint of a user has been registered according to the above-mentioned fingerprint data registration processing. By the way, the present processing is included in the fingerprint control program 13e and is executed repeatedly together with the other remaining processings of the fingerprint control program 13e. Firstly, by operating the cursor key 21b of the operation panel 21, such a display screen as shown in FIG. 16A is displayed on the display part 22, and the user ID and password are input. In this manner, the two-stage authentification, that is, the user authentification in the operation mode transfer time and the fingerprint authentification in the operation time can improve the safety of the operation and data.

Figure 16A:
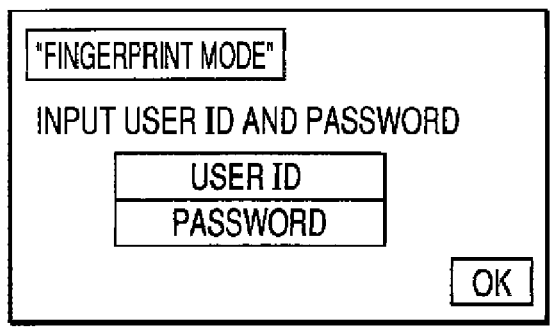
FIGS. 16A to 16F are views showing an example of display screens used when executing the processings shown in FIG. 14.
Figure 16B:
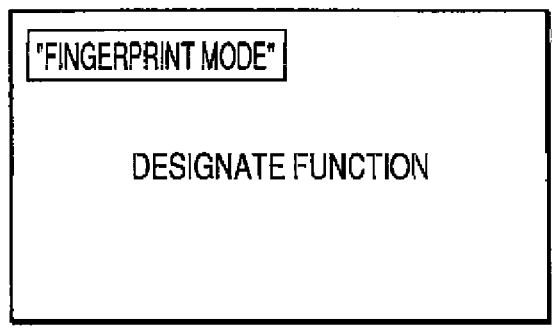

When the user ID and password are input correctly (S21: Yes), there is displayed such a function selection screen as shown in FIG. 16B, waiting for the input of the user fingerprint. When a finger is put on the fingerprint read device 21h and the fingerprint data thereof are read (S22: Yes), the fingerprint data storage area shown in FIG. 6 is referred to. When the fingerprint data are present at an update timing (S23: Yes, the details of which will be discussed later), there is displayed such a message screen as shown in FIG. 16C, prompting the user A to update the fingerprint data (S24).

The update timing occurs when a given period such as three months or six months has passed since the registration date of the fingerprint data registered in the fingerprint data storage area, or when an update timing flag (the details of which will be discussed later) is set.

Figure 3:
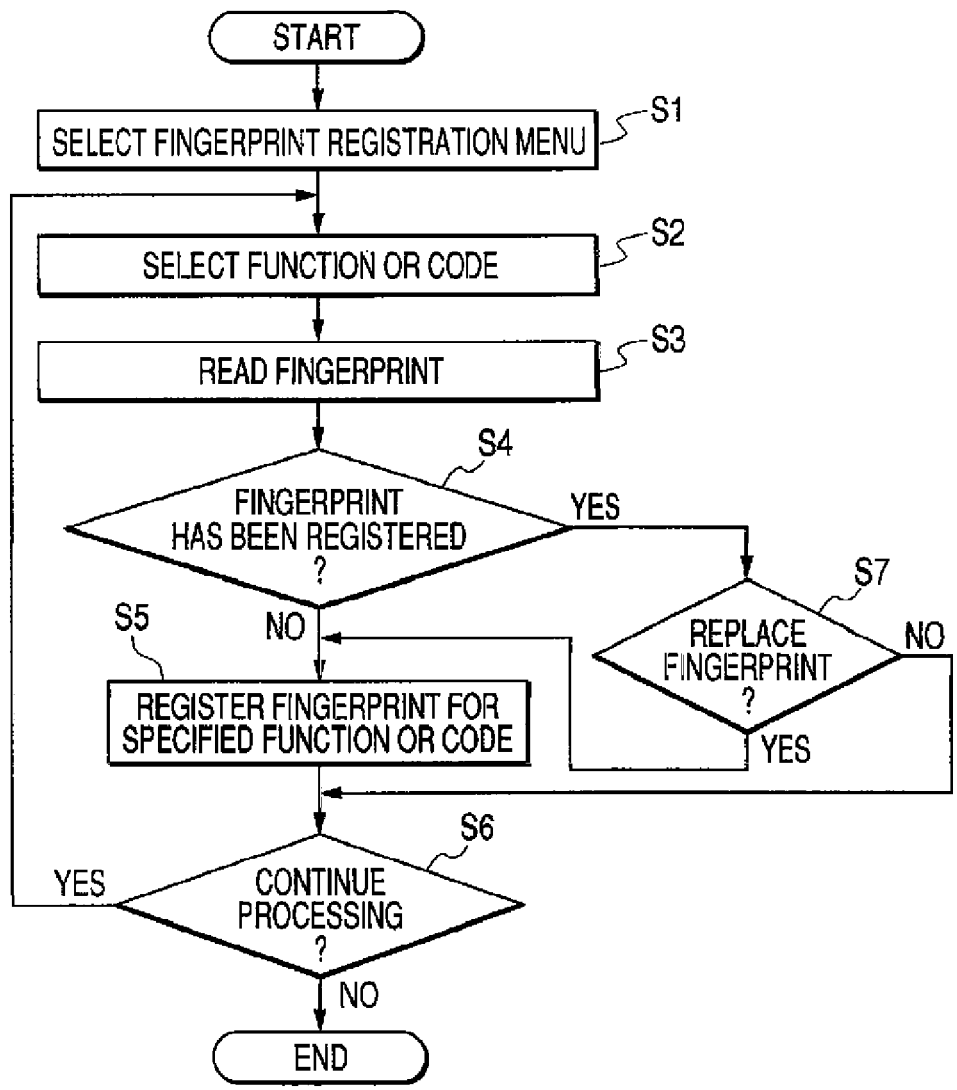
FIG. 3 is a flow chart showing a fingerprint data registration processing for registering fingerprint data corresponding to functions, set items or set values.
Figure 4:
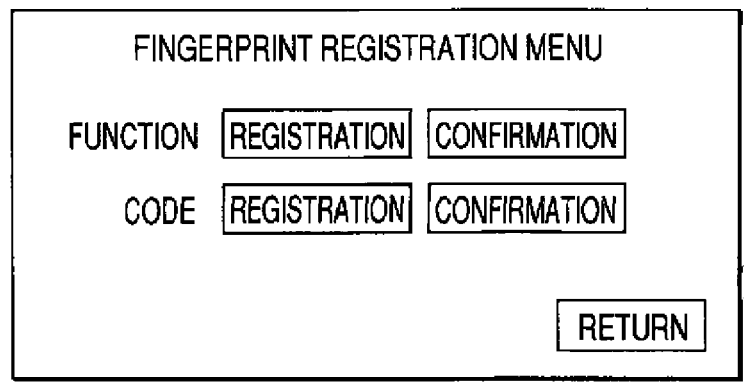
FIG. 4 is a view showing an example of a display screen used to register the fingerprint data.
Figure 16C:
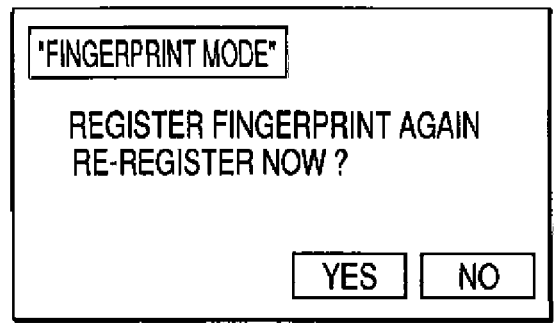

On a display screen shown in ¥FIG. 16C, when the user presses down the "YES" button and registers the fingerprint data again according to the procedure shown in FIG. 3, or when the user presses down the "NO" button and skips the re-registration of the fingerprint data, it is checked whether the function corresponding to the fingerprint data read are already registered or not, and then processings corresponding to the check results should be carried out. For example, when the fingerprint data correspond to the "menu selection" (S25: Yes), the selective operation of various menu of the apparatus (S26) can be executed; when the fingerprint data correspond to the "FAX" (S27: Yes), the operation of the FAX menu (S28) can be executed; and, when the fingerprint data correspond to the "copy" (S29: Yes), the operation of the copy menu (S30) can be executed. Also, when the function corresponding to the fingerprint data read is not registered or when the fingerprint is not read correctly (S29: No), an error processing (S1, the details of which will be discussed later) is executed.

Figure 14:
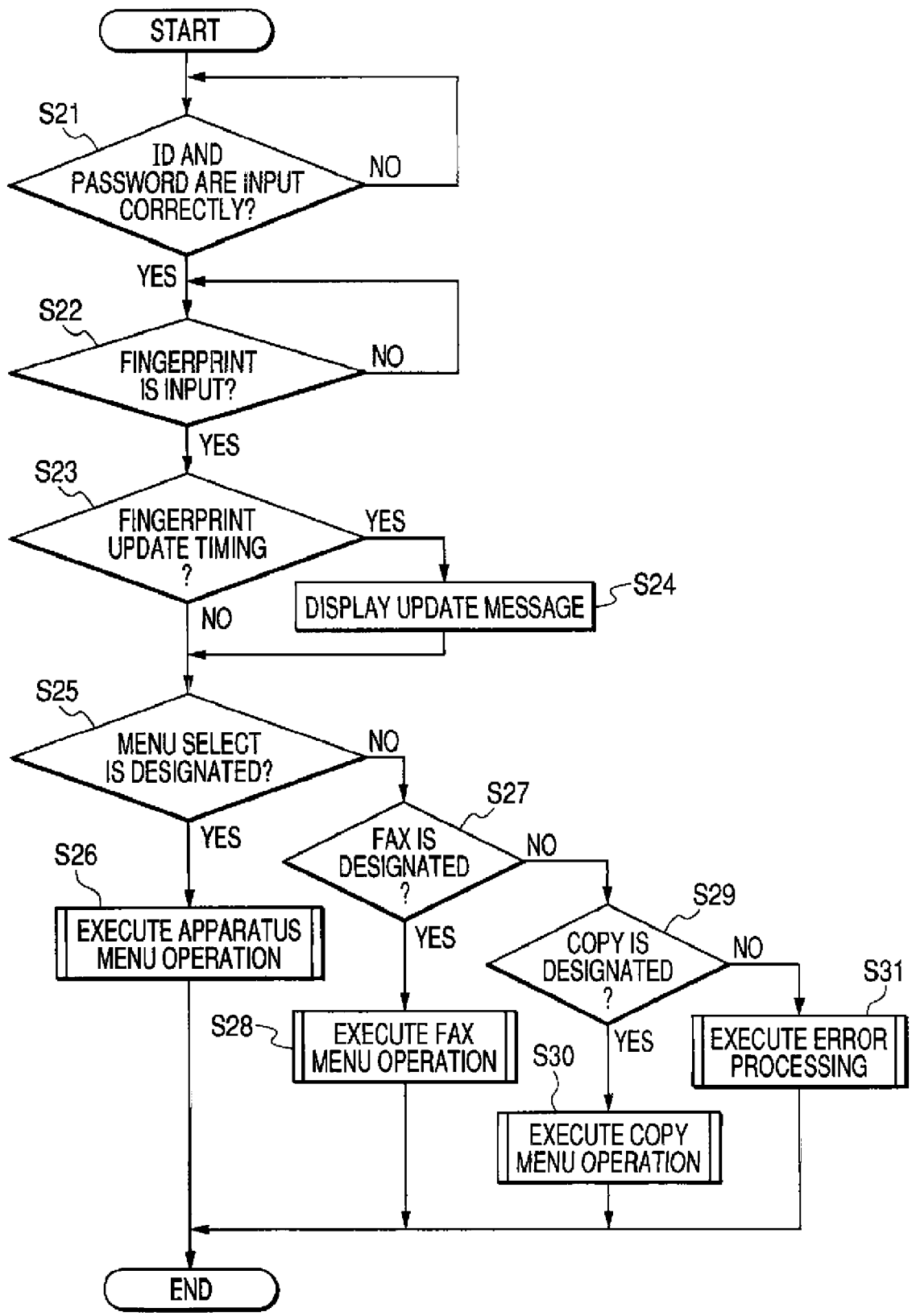
FIG. 14 is a flow chart showing an operation processing to be executed using fingerprint data corresponding to functions or set items and their associated set values.
Figure 15:
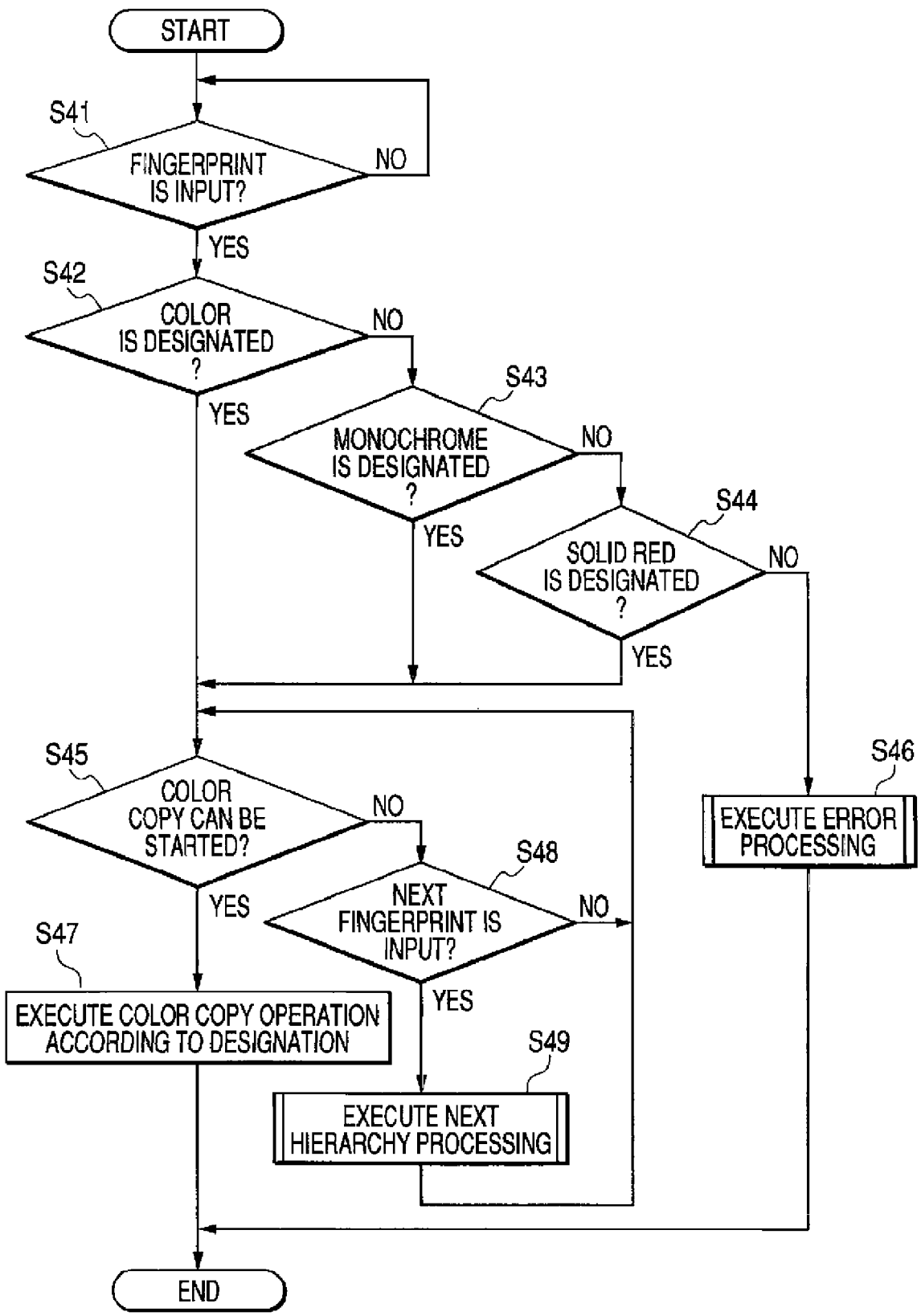
FIG. 15 is a flow chart showing a copy menu processing shown in FIG. 14.
Figure 16D:
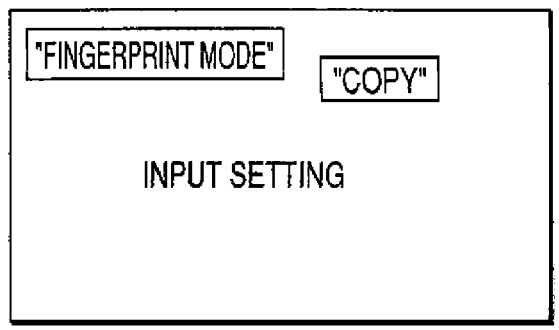

FIG. 15 is a flow chart of the details of a copy menu operation which corresponds to a step S30 shown in FIG. 14. When the fingerprint data read are equivalent to "copy" (S29 in FIG. 14: Yes), there is displayed such a screen as shown in FIG. 16D, which displays the selected function (copy) and waits for input of a set item or a set value corresponding to a second hierarchy.

Figure 16E:
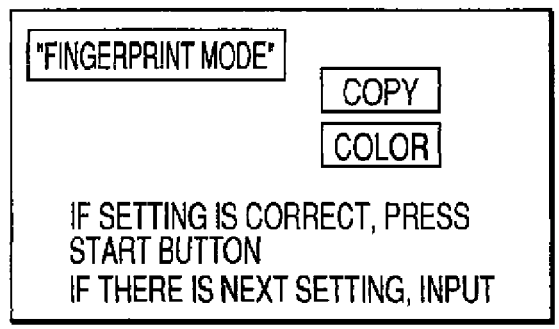
Figure 16F:
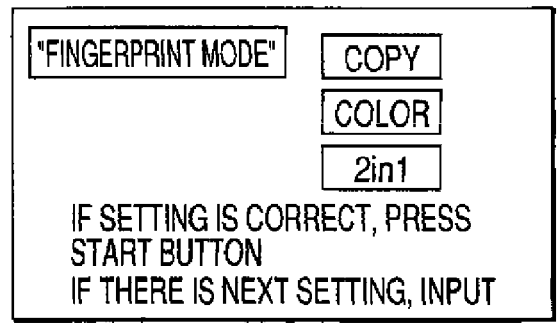

In a state for waiting for input of the set item or set value, when the fingerprint date are read (S41: Yes), the fingerprint data storage area is referred to check whether a set item or a set value corresponding to the fingerprint data has been registered or not, thereby selecting the corresponding set item or set value. At the then time, the user may check whether it is a fingerprint update timing or not. FIG. 16E is a display screen to be displayed when fingerprint data corresponding to "color" is read (S42: Yes). In this state, when the start button 21f is depressed (S45: Yes), a color copy operation is carried out (S47).

Also, when a finger corresponding to "monochrome" is put on the fingerprint read device 21h and the fingerprint of the finger is read (S43: Yes), a monochrome copy operation is executable. When a finger corresponding to "solid red" is put on the fingerprint read device 21h and the fingerprint of the finger is read (S44: Yes), a red copy operation is executable. Also, when a function corresponding to the fingerprint data read has not been registered, or when the fingerprint is not read properly (S44: No), an error processing (S46, the details of which will be discussed later) is executed.

When a set item or a set value is set in a next hierarchy (that is, it is set in two different hierarchies), plural set items or set values can be set. In a screen shown in FIG. 16E, when, without pressing down the start button 21f, in order to designate a set value in the next hierarchy, the fingerprint data are input, for example, the fingerprint data of the right hand third finger are input (S45: No, S48: Yes), the processing goes to a next hierarchy processing in S49, where there is selected the set value of a set item "copy type" belonging to the next hierarchy of the set value of the previously set item "color" and, based on the registration contents shown in FIG. 6A, there is set "2 in 1" which corresponds to the right hand third finger (S49); and, the then state is displayed on a screen shown in FIG. 16F. In this state, when the start button 21f is pressed down (S45: Yes), a color "2 in 1" copy operation is executed (S47). Also, when there exists a set item belonging to a further lower hierarchy and the set item is to be designated, the start button 21f is not depressed (S45: No) but the next fingerprint data are input (S48: Yes), the set value is set similarly to the above case. Therefore, until the start button 21f is depressed, when plural pieces of fingerprint data are read sequentially, the processings in S45, S48 and S49 can be executed repeatedly: that is, copy operations composed of combinations of plural set values can be designated.

It is also expected that a copy function is selected and, without entering other set value, the start button 21f is depressed. In that case, there is executed a copy operation which uses a default set value previously stored in the memory 16. As the default set value, for example, there can be expected similar contents to those of a normal copy operation to be carried out by an ordinary copying machine that contain "monochrome" for color, one side for a copy type, 1 for the number of copies and equal size. And, in the above-mentioned processing, in a state where "color" is designated by the reading of the fingerprint, when the start button 21f is depressed without reading any other fingerprint, the default set value is used as another set value which is necessary for the copy processing.

Also, correction (re-entry) of the selected contents of the function and set item or set value is also possible. For example, in a state where fingerprint data are read and the registration contents corresponding to the fingerprint data are displayed, when the stop button 21g is depressed, the contents currently displayed are cancelled and the processing returns to a fingerprint data waiting state.

(Fingerprint Mode Operation 2)

Now, description will be given below of an operation processing using fingerprint data corresponding to code information with reference to FIGS. 17, 18 and 19A to 19E. The present processing is included in the fingerprint control program 13e and is repeatedly executed together with the other remaining processings of the fingerprint control program 13e. Firstly, by operating the cursor key 21b or the like of the operation part 21, a user ID and a password are input on a similar display screen to the display screen shown in FIG. 16A in the display part 22.

Figure 19A:
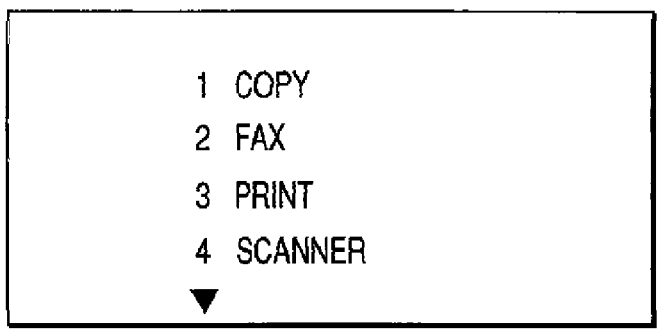
FIGS. 19A to 19E are views showing an example of display screens used when executing the processings shown in FIG. 17.

When the user ID and password are input correctly (S51: Yes), there is displayed such a function select screen as shown in FIG. 19A, and the processing is waiting for input of a fingerprint. By the way, steps (S53, S54) of checking the update timing of the fingerprint data read and prompting the user A to update the fingerprint data are similar to the steps S23 and S24 shown in FIG. 14 and thus the description thereof is omitted here.

The fingerprint data storage area shown in FIG. 8 is referred to, and it is checked whether a function corresponding to the fingerprint data read has already been registered in the fingerprint data storage area or not, and there is executed a processing which corresponds to the check results. For example, when the fingerprint data read correspond to "1" (S55: Yes), a copy operation processing is executable (S56); when the fingerprint data correspond to "2" (S57: Yes), a FAX operation processing is executable (S58); and, when the fingerprint data correspond to "3" (S59: Yes), a scan operation processing is executable (S60). When fingerprint data corresponding to other codes than these codes are read, similarly to the above, an operation processing can be executed according to the registration contents. Also, when a function corresponding to the fingerprint data read has not been registered or when the finger is not read properly (S59: No), an error processing (S61, the details of which will be discussed later) is executed.

Figure 17:
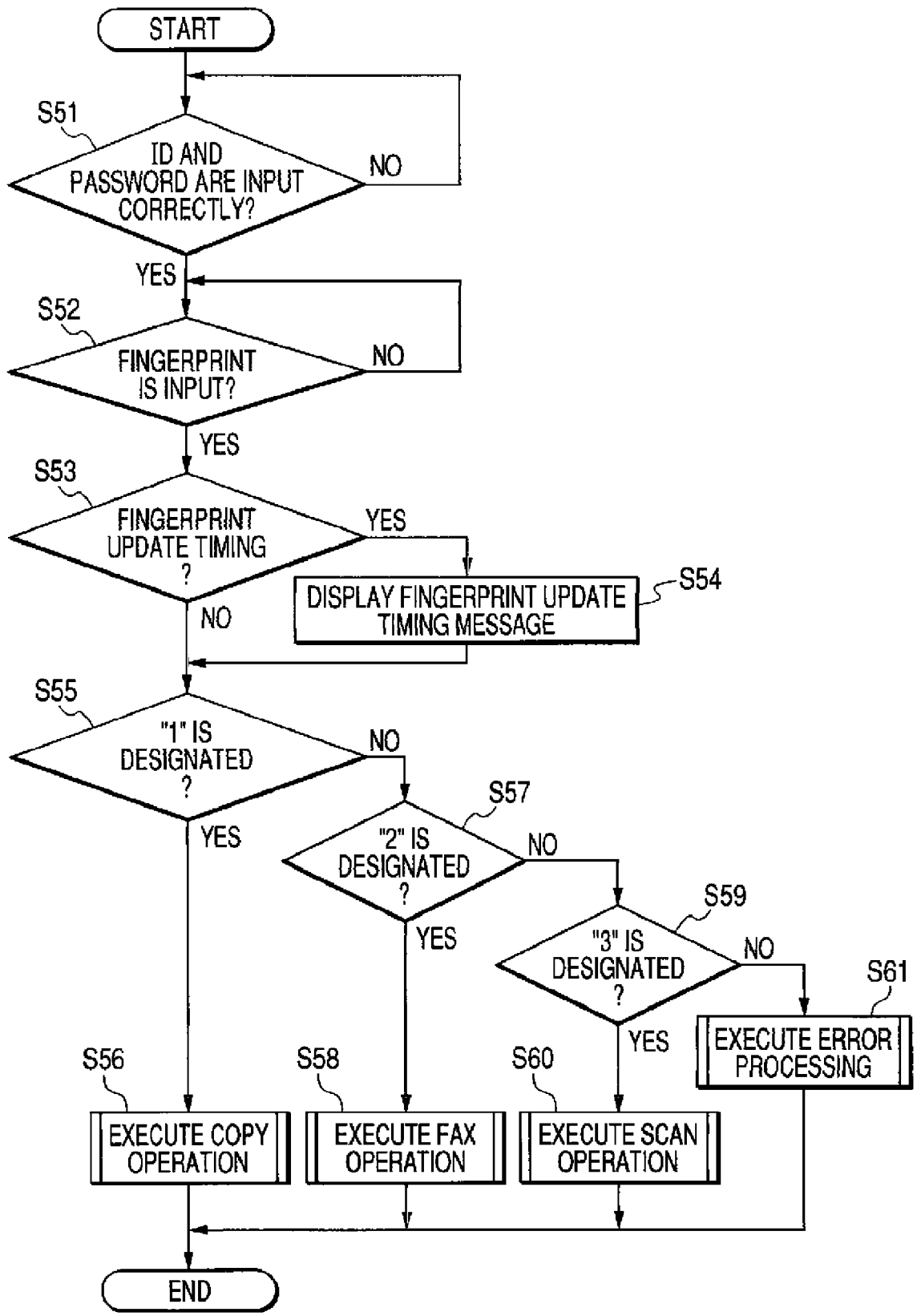
FIG. 17 is a flow chart showing an operation processing to be executed using fingerprint data corresponding to code information.
Figure 18:
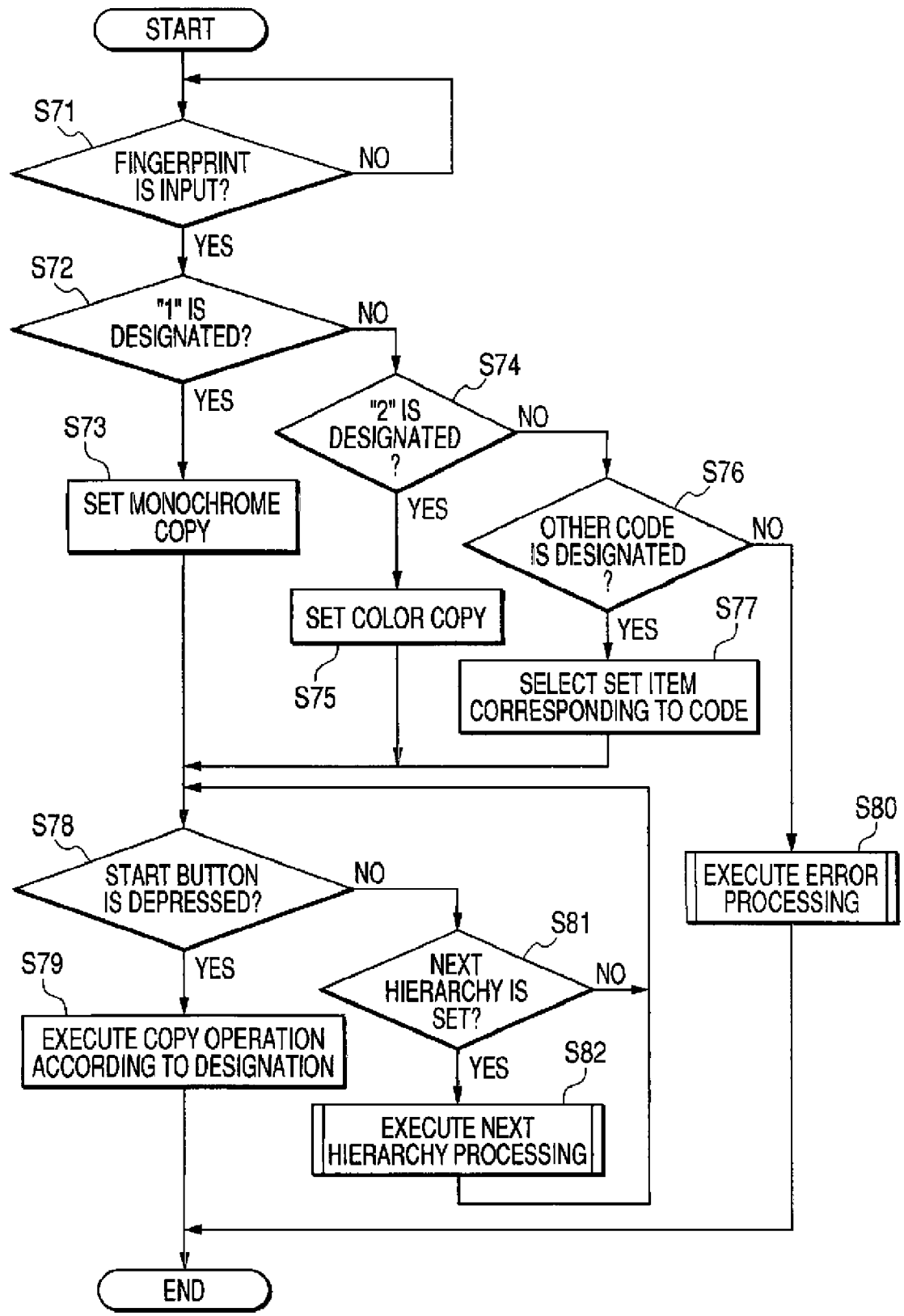
FIG. 18 is a flow chart showing a copy processing shown in FIG. 17.
Figure 19B:
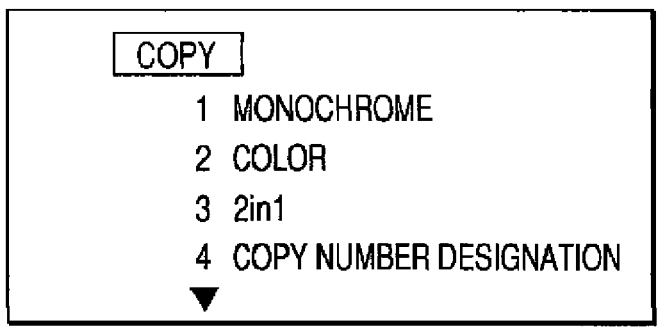

FIG. 18 is a flow chart to show the details of a copy operation corresponding to the step S56 shown in FIG. 17. When the fingerprint data read correspond to a numeral "1" (S55 in FIG. 17: Yes), there is displayed such a screen as shown in FIG. 19B, on which the selected function (copy) is displayed, and also the processing waits for entry of a set item or a set value.

Figure 19C:
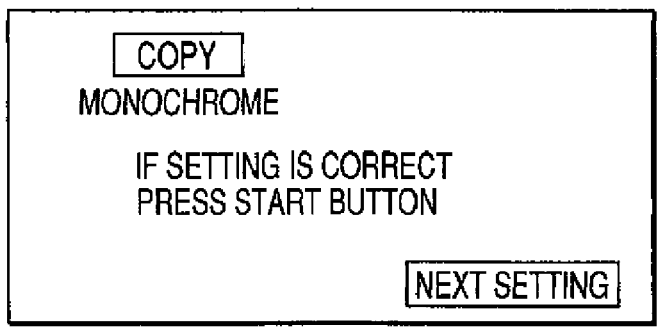
Figure 19D:
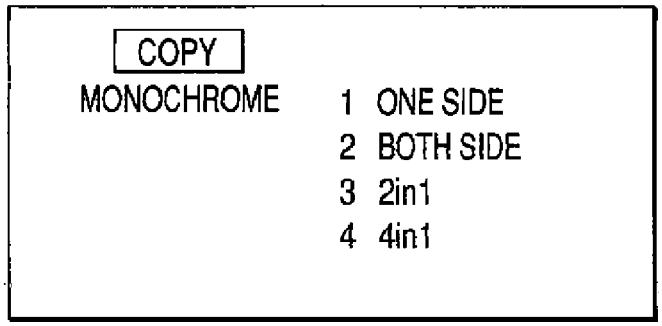
Figure 19E:
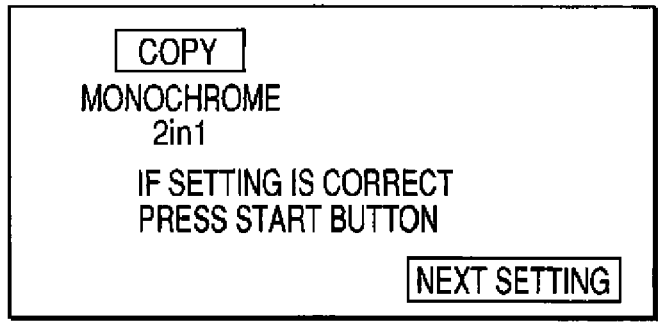

In this state, when the user A puts his or her index finger corresponding to "1" on the fingerprint read device 21h (S71: Yes, S72: Yes), as shown in FIG. 19C, a monochrome copy operation is set (S73). Prior to setting of the monochrome copy operation, it may also be checked whether the current time is a fingerprint data update timing or not. Also, when the user A puts his or her middle finger on the fingerprint read device 21h (S74: Yes), a color copy operation is set (S75). When the other finger is put on the fingerprint read device 21h (S76: Yes), there is selected a set item or a set value which is equivalent to a code corresponding to the fingerprint data of the finger (S77). Also, when a function corresponding to the fingerprint data read is not registered or when the fingerprint is not read properly (S76: No), an error processing (S80, the details of which will be discussed later) is executed.

In a state where a screen shown in FIG. 19C is displayed, when the start button 21f is depressed (S78: Yes), a monochrome copy operation is executed (S79). By the way, similarly to the above-mentioned fingerprint mode operation 1, plural set items or set values can be set, and correction (re-entry) of the function setting and contents selected is also possible.

By the way, similarly to the above-mentioned fingerprint operation mode 1, when the set item or set value is set in a next hierarchy (that is, it is set in two different hierarchies), plural set items or set values can be set. On a screen shown in FIG. 19C, when, without depressing the start button 21f (S78: No), in order to designate a set value in a next hierarchy, a "next setting" button on the screen is depressed (S81: Yes), the processing goes to a next hierarchy processing in S82. In the next hierarchy processing, there is displayed a screen shown in FIG. 19D, where, for example, when the fingerprint data corresponding to the right hand third finger are input, there is obtained the set value of a set item "copy type" in the next hierarchy; and, based on the registration contents of FIG. 9, there is set "2 in 1" and, at the then time, there is displayed a screen shown in FIG. 19E. In this state, when the start button 21f is pressed down (S78: Yes), there is executed a copy operation in "color" and "in 2 in 1" (S79). Also, when there is a set item belonging to a further lower hierarchy and the user wants to designate this set item, the start button 21f is not depressed (S78: No) but the "next setting" button is pressed down and also the next fingerprint data are input (S81: Yes, S82). As a result, similarly to the above, there can be set a set value belonging to the further next hierarchy. Therefore, until the start button 21f is pressed down, when plural pieces of fingerprint data are read sequentially, the processings in S78, S81 and S82 can be carried out repeatedly, thereby being able to designate a copy operation using combinations of plural set values.

By the way, the processings, which are to be executed when the copy function is selected and the start button 21f is depressed without inputting other set values, are similar to those executed in the above-mentioned fingerprint mode operation 1.

Figure 20:
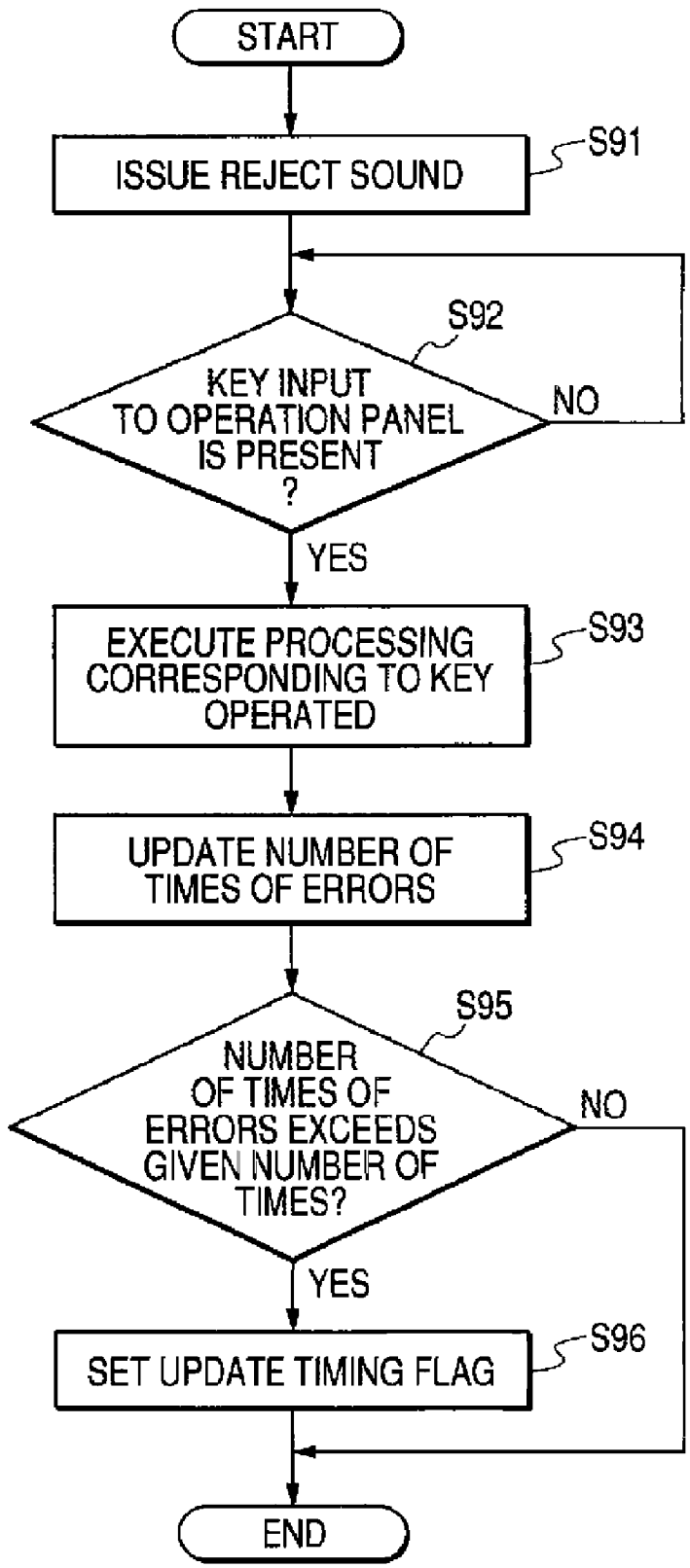
FIG. 20 is a flow chart showing an error processing.

Next, description will be given below of an error processing corresponding to a step S31 shown in FIG. 14, a step S46 shown in FIG. 15, a step 61 shown in FIG. 17 and a step S80 shown in FIG. 18 with reference to FIG. 20. Firstly, there is issued from the speaker 21j a reject sound indicating that the reading of the fingerprint is not carried out correctly (S91). Or, a message to this effect may also be displayed on the display part 22. After then, when the key operation of the operation part 21 is carried out (S92: Yes), there is executed a processing corresponding to the key operated (S93). Thanks to this, even when, because of the lowered reading accuracy of the fingerprint, the fingerprint cannot be read and thus an operation using the fingerprint is made impossible during the fingerprint reading operation, the operation can be switched over to another operation, that is, an input operation using the operation panel, where the setting operation can be continued. This can eliminate the need to operate the multifunction apparatus again from the beginning, which results in the enhanced operation efficiency of the apparatus.

And, the number of times of errors the present user has made in such a fingerprint data storage area as shown in FIG. 6B or in FIG. 8 is updated (S94). The count of the number of times of errors may be stored in the unit of the fingers of the user as in FIGS. 6B and 8 (the finger that is most similar to the fingerprint data read but does not meet the determination standard), or, instead of the unit of the fingers, the count may also be stored in the unit of the user. When the count is stored in the unit of the users, the fingerprint data on all fingers must be updated.

And, when the number of times of errors exceeds a given number of times, for example, five times (S95: Yes), an update timing flag "0" is set to "1" (S96). Here, based on the update timing flag to be set, there are executed the processings in S23, S24 shown in FIG. 14 as well as the processings in S53, S54 shown in FIG. 17, thereby to inform the user that the fingerprint data must be updated.

(Multifunction Apparatus System)

Figure 21:
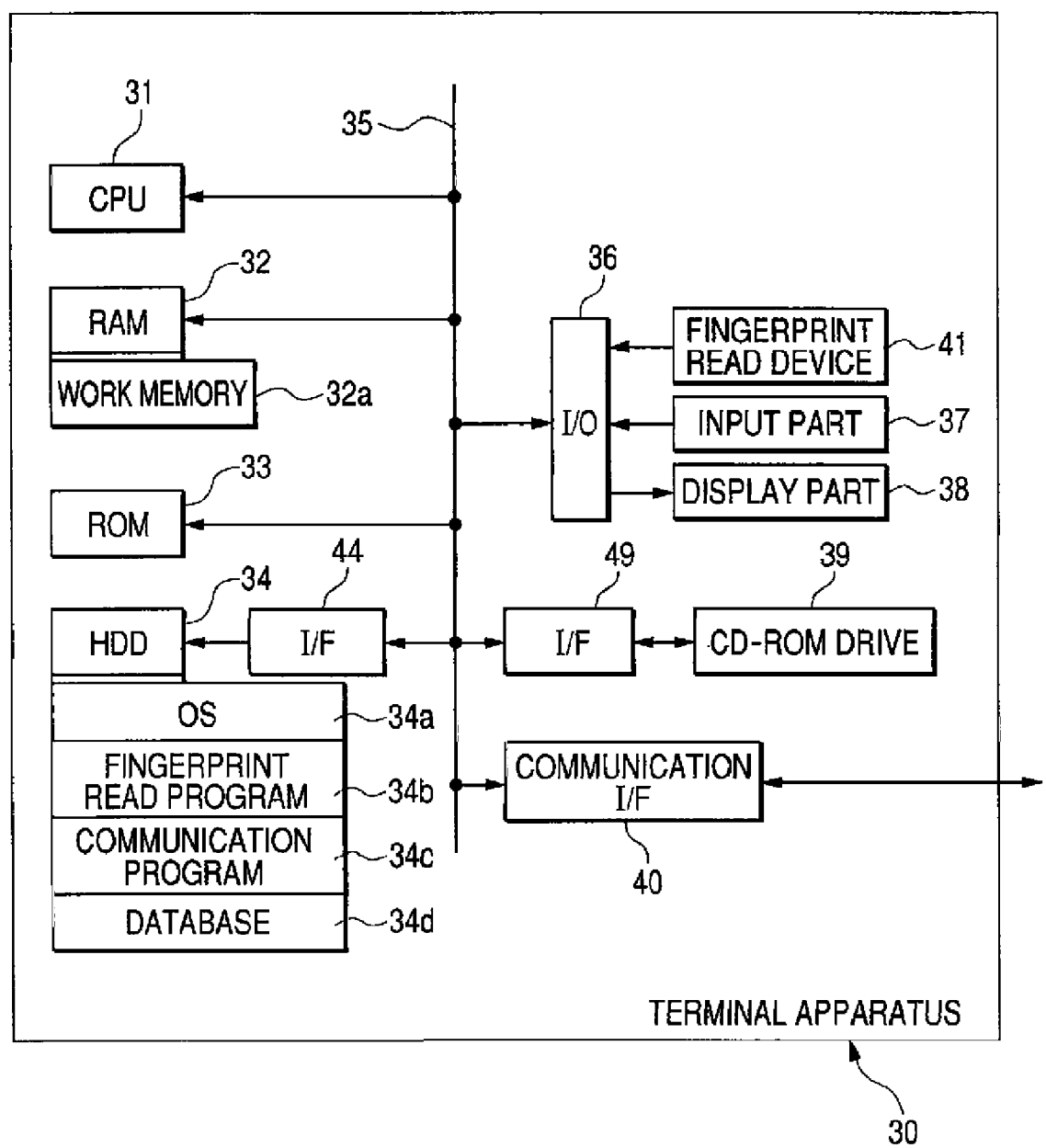
FIG. 21 is a block diagram showing a terminal apparatus.

The fingerprint data registration of the multifunction apparatus 10 may also be carried out by the terminal apparatus 30. FIG. 21 is a block diagram showing the electric structure of the terminal apparatus 30. The terminal apparatus 30 is structured as a personal computer (or a work station) which comprises a CPU 31, a RAM 32 including a work memory 32a, a ROM 33 for storing various programs, a hard disk drive (HDD) 34 functioning as a storage device, a bus line 35, an input/output part (in FIG. 21, it is expressed as "I/O") 36, a CD-ROM drive 39, a communication interface (in FIG. 21, it is expressed as "I/F") 40 to be connected to a communication network 50, and the like.

The HDD 34 and CD-ROM drive 39 are connected through interfaces (I/F) 44, 49 to the bus line 35. The HDD 34 stores therein an OS34a functioning as the basic software of the terminal apparatus 30, a fingerprint read program 34b for realizing the function of the fingerprint data registration, a communication program 34c for executing communication with apparatus (the multifunction apparatus 10 and the like) arranged on the communication network 50, a database 34d for storing the fingerprint data, and the like. To the input/output part 36, there are connected an input part 37 composed of a keyboard or a mouse, a display part 38 composed of an LCD or a CRT, and a fingerprint read device 41 functioning as terminal apparatus read unit.

The terminal apparatus 30 carries out the reading and registration of the fingerprint data, the setting of operation modes, and the transmission of the registered fingerprint data and set operation modes to the multifunction apparatus 10. The method for reading and registering the fingerprint data is similar to the method shown in FIG. 3 as well as the method for setting the operation modes is similar to the method shown in FIG. 12. Therefore, the description thereof is omitted here.

In the database 34d which holds contents registered by a registration unit, there are stored such fingerprint data by users as shown in FIGS. 6 and 8. Also, when the fingerprint data are made to correspond to such code information as shown in FIG. 8, in the multifunction apparatus 10, there is previously stored information in which the code information is allocated in association with functions, set items or set values. These data may also be structured such that they are stored while they are divided according to the kinds of the multifunction apparatus 10.

Figure 22:
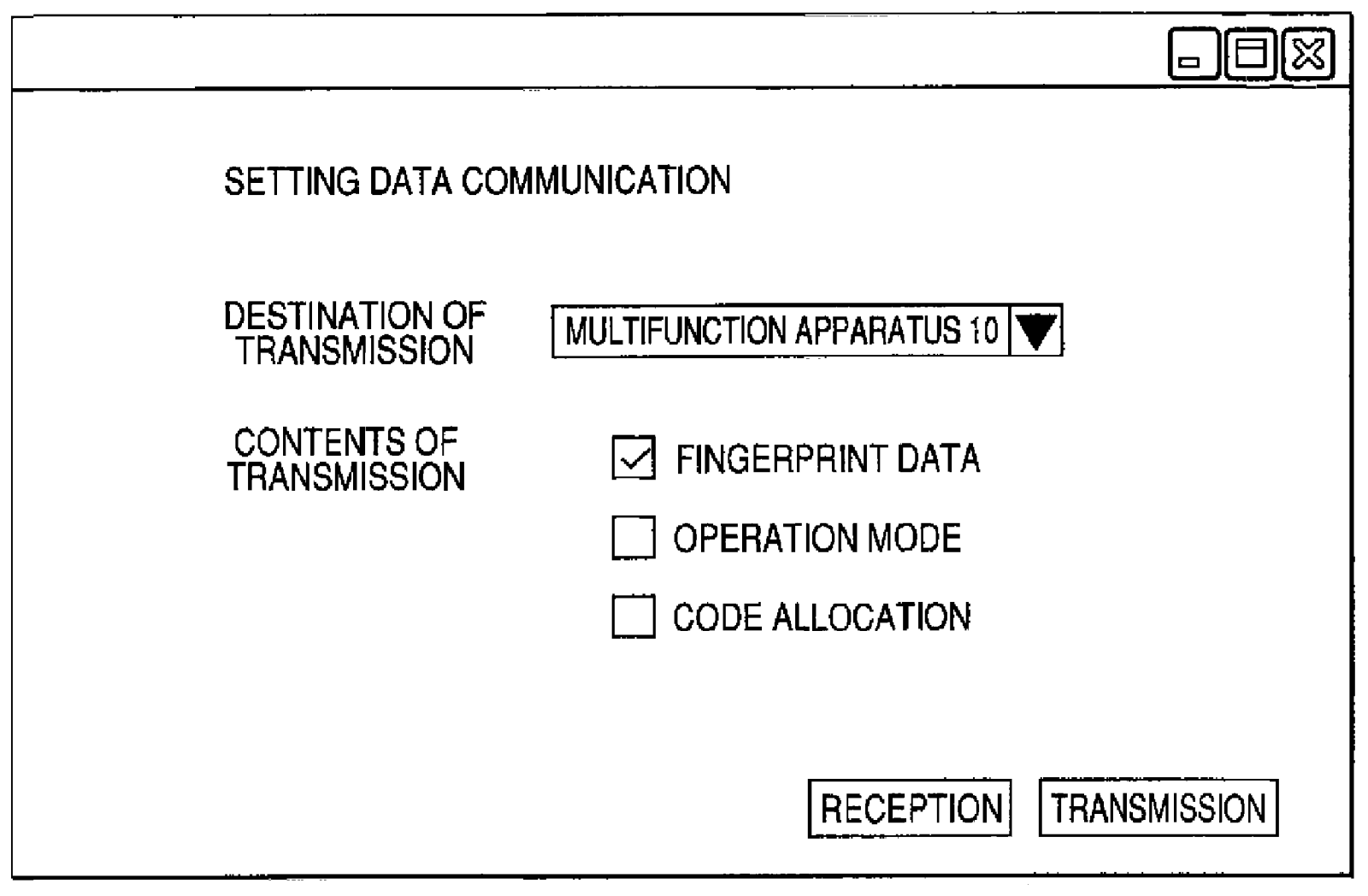

The storage contents of the database 34d can be transmitted from the terminal apparatus 30 to the multifunction apparatus 10. According to the display screen of the display part 38, there are designated a multifunction apparatus (the name of a multifunction apparatus, a network address and the like) to which the storage contents are transmitted, and the contents of the transmission (fingerprint data, operation modes, and the allocation of the code information). FIG. 22 shows an example of a display screen which is used to transmit the fingerprint data to the multifunction apparatus 10. When a "transmission" button is clicked, the data designated are read out from the database 34d and are transmitted to the multifunction apparatus 10. The multifunction apparatus 10 stores the transmitted data in the memory 16.

Also, the terminal apparatus 30 is able to acquire the storage contents (fingerprint data, operation modes, allocation of the code information) of the memory 16 of the multifunction apparatus 10. On the screen shown in FIG. 22, when a "receive" button is clicked, the terminal apparatus 30 receives the designated data from the multifunction apparatus 10. The thus received data are stored once in the work memory 32a and, when a given command is executed, the data are stored in the corresponding area of the database 34d. When plural multifunction apparatus are connected, after one of the multifunction apparatus is designated, a similar processing to the above is executed.

Although description has been given heretofore of the aspects of the invention, they are just examples and the invention is not limited to them. Various changes based on the knowledge of a person skilled in the art are also possible without departing from the scope of the invention.

For example, the function capable of registering the fingerprint data, set items or set values are not limited to the contents of the above-mentioned aspects but they can be applied to various functions or set items. Also, there may also be employed a structure which allows an administrator to set a function capable of registering the fingerprint data according to users and also to put a limit to the set items (set values).

Also, in FIGS. 16B and 16D, if there is room in the display screen, there may also be employed a structure which can display information according to users, for example, functions registered as the functions or set items (set values) that can be selected by inputting the fingerprint data, and correspondence between the functions and fingers. Use of this structure can facilitate an operation to be executed by a user using his or her fingerprints.

Further, in the example of the display screen shown in FIG. 19C, there is employed a structure in which, when designating a set item (set value) belonging to a next hierarchy, after the "next setting" button is depressed to thereby display the choices in the next hierarchy, the fingerprint can be read. However, it is also possible to employ a structure which allows the successive readings of the fingerprints corresponding to the code information to be designated without depressing the "next setting" button. In other words, when designating the code information, if the code information is composed of codes easy for a user to learn, for example, a sequence of numbers or a sequence of alphabetic letters, it can be expected that, as the user becomes used to the information codes, the user allows the fingerprint to be read without confirming the screen each time. This makes it possible to read the fingerprints successively, thereby being able to execute the action of the multifunction apparatus based on the desired setting in a short time.

Also, the structure of the operation panel is not limited to the structure shown in FIG. 2. For example, when there is employed a structure which can basically accept only the fingerprint input, the function select button 21c, numeric keypad 21d, one-touch button 21e and the like are not always necessary.

Further, in the above-mentioned aspects, with regard to the correspondence between the code information and set items (set values), description has been given of an example in which they are previously registered in the multifunction apparatus 10. However, there may also be employed a structure which allows a user to execute such correspondence.

What is claimed is:

1. A multifunction apparatus comprising:
a read unit that reads a fingerprint;
a designate unit that designates one of a function, a set item and a set value, wherein the set item and the set value are referred to when executing the function;
a storage unit;
a registration unit that registers, in the storage unit, one fingerprint read by the read unit and one of the function, the set item and the set value designated by the designate unit in association with each other;
a call unit that reads from the storage unit at least one of the function, set item and set value associated with the fingerprint read by the read unit;
an instruct unit that instructs execution of an operation based on at least one of the function, set item and set value read by the call unit; and
an execute unit,
wherein the function hierarchically includes at least one set item which is referred to when executing the function, the at least one set item including a plurality of set values settable,
wherein the registration unit registers different fingerprints in association with the plurality of set values of the at least one set item, respectively,
wherein the registration unit allows registration of a same fingerprint in association with the function and the at least one set item hierarchically included in the function, and the at least one set item is registerable by the registration unit with the same fingerprint,
wherein when a plurality of fingerprints are read sequentially by the read unit, the call unit sequentially reads at least one of the function, set item and set value associated with each of the fingerprints, and
when the instruct unit instructs the execution, the execute unit executes the operation based on at least one of the thus read function, set item and set value.

2. The multifunction apparatus according to claim 1, wherein the function includes at least a copy function, a print function and a facsimile function, and different fingerprints are stored in the storage unit for different functions.

3. The multifunction apparatus according to claim 1, the call unit reads from the storage unit the set value of the set item corresponding to the fingerprint read by the read unit in a state where the function is selected, and the execute unit executes an operation corresponding to the set value of the set item read for the selected function.

4. A multifunction apparatus comprising:
a read unit that reads a fingerprint;
a designation unit that designates one code information;
a first storage unit;
a registration unit that registers, in the first storage unit, one fingerprint read by the read unit and one code information designated by the designation unit in association with each other;
a second storage unit that allocates the code information for at least one of a function of the multifunction apparatus and a set value of a set item that is referred to when executing the function, the second storage unit storing the thus allocated code information;
a call unit that reads from the first storage unit the code information associated with the fingerprint read by the read unit and reads from the second storage unit the function or the set value of the set item corresponding to the code information; and
an execute unit that executes an operation based on the function or the set value of the set item read by the call unit,
wherein the function hierarchically includes at least one set item which is referred to when executing the function, the at least one set item including a plurality of set values,
wherein the second storage unit allocates and stores different code information in association with the plurality of set values of the at least one set item, respectively, and
wherein the registration unit allows registration of a same fingerprint in association with different code information and the at least one set item is registerable by the registration unit with the same fingerprint.

5. The multifunction apparatus according to claim 4, wherein the function includes at least a copy function, a print function and a facsimile function, and different code information are stored in the first storage unit for different functions.

6. The multifunction apparatus according to claim 4, wherein,
the call unit reads the code information corresponding to the fingerprint read by the read unit from the first storage unit and reads the set value of the set item corresponding to the code information from the second storage unit in a state where the function is selected, and
the execute unit executes an operation corresponding to the set value of the set item read for the selected function.

7. The multifunction apparatus according to claim 4, further comprising an instruct unit that instructs execution of an operation corresponding to the function or the set value of the set item read by the call unit,
wherein when a plurality of fingerprints are read sequentially by the read unit, the call unit reads code information corresponding to the thus read fingerprints and functions or the set values of the set items corresponding to the code information sequentially, and
when an instruction is given by the instruct unit, the execute unit executes an operation based on the function and the set value of the set item read until the instruction is given by the instruct unit.

8. The multifunction apparatus according to claim 1, further comprising a registration content display unit that, when the fingerprint is read by the read unit and the function, set item or set value corresponding to the fingerprint is registered in the storage unit, displays registration contents.

9. The multifunction apparatus according to claim 4, further comprising a registration content display unit that, when the fingerprint is read by the read unit and the code information corresponding to the fingerprint is registered in the first storage unit, and further when the function, set item or set value corresponding to the code information is registered in the second storage unit, displays registration contents.

10. The multifunction apparatus according to claim 1, further comprising:
a first determination unit that determines whether an administrator identification information to identify an administrator is input or not; and
a registration mode transfer unit that, when the first determination unit determines that the administrator identification information is input, transfers a mode of the multifunction apparatus to a registration mode for accepting registration to be carried out by the registration unit.

11. The multifunction apparatus according to claim 4, further comprising:
a first determination unit that determines whether an administrator identification information to identify an administrator is input or not; and
a registration mode transfer unit that, when the first determination unit determines that the administrator identification information is input, transfers a mode of the multifunction apparatus to a registration mode for accepting registration to be carried out by the registration unit.

12. The multifunction apparatus according to claim 1, further comprising:
a second determination unit that determines whether an individual identification information to identify an individual is input or not; and
an operation mode transfer unit that, when the second determination unit determines that the individual identification information is input, transfers a mode of the multifunction apparatus to an operation mode to allow the read unit to read the fingerprint for accepting operations to be executed by the call unit and the execute unit.

13. The multifunction apparatus according to claim 4, further comprising:
a second determination unit that determines whether an individual identification information to identify an individual is input or not; and
an operation mode transfer unit that, when the second determination unit determines that the individual identification information is input, transfers a mode of the multifunction apparatus to an operation mode to allow the read unit to read the fingerprint for accepting operations to be executed by the call unit and the execute unit.

14. The multifunction apparatus according to claim 12, further comprising an operation panel containing at least one of a key and a switch,
wherein an input through the operation panel is accepted in the operation mode.

15. The multifunction apparatus according to claim 13, further comprising an operation panel containing at least one of a key and a switch,
wherein an input through the operation panel is accepted in the operation mode.

16. The multifunction apparatus according to claim 1, further comprising a registration content confirm unit that confirms contents stored in the storage unit associated with the fingerprint.

17. The multifunction apparatus according to claim 4, further comprising a registration content confirm unit that confirms contents stored in the first storage unit associated with the fingerprint.

18. The multifunction apparatus according to claim 1, further comprising:
a timing generate unit that generates a predetermined timing; and
an update request unit that requests update of the registered contents according to a timing generated by the timing generate unit.

19. The multifunction apparatus according to claim 4, further comprising:
a timing generate unit that generates a predetermined timing; and
an update request unit that requests update of the registered contents according to a timing generated by the timing generate unit.

20. The multifunction apparatus according to claim 18, further comprising an error count record unit that records the number of times the fingerprint reading by the read unit is not made correctly,
wherein the timing generate unit, when the error count record unit shows that the number of times of errors exceeds a predetermined value, regards it as the predetermined timing.

21. The multifunction apparatus according to claim 19, further comprising an error count record unit that records the number of times the fingerprint reading by the read unit is not made correctly,
wherein the timing generate unit, when the error count record unit shows that the number of times of errors exceeds a predetermined value, regards it as the predetermined timing.

22. The multifunction apparatus according to claim 18, further comprising a period measure unit that measures a period having elapsed since registration of the fingerprint by the registration unit,
wherein the timing generate unit, when the period measured by the period measure unit exceeds a predetermined value, regards it as the predetermined timing.

23. The multifunction apparatus according to claim 19, further comprising a period measure unit that measures a period having elapsed since registration of the fingerprint by the registration unit,
wherein the timing generate unit, when the period measured by the period measure unit exceeds a predetermined value, regards it as the predetermined timing.

24. A multifunction apparatus system comprising:
a multifunction apparatus; and
a terminal apparatus connected to the multifunction apparatus via a network,
wherein the terminal apparatus comprises:
a terminal apparatus read unit that reads a fingerprint; and
a registration unit that registers the fingerprint read by the terminal apparatus read unit and at least one of a function of the multifunction apparatus, a set item and a set value, which are referred to when executing the function, in association with each other, wherein the multifunction apparatus comprises:
an information acquire unit that acquires registration contents registered by the registration unit from the terminal apparatus;

a designate unit that designates one of a function, a set item and a set value, wherein the set item and the set value are referred to when executing the function;
a storage unit that stores the registration contents acquired by the information acquire unit;
a read unit that reads the fingerprint;
   a call unit that reads from the storage unit at least one of the function, set item and set value associated with the fingerprint read by the read unit;
   an instruct unit that instructs execution of an operation corresponding to the function, set item or set value read by the call unit; and
   an execute unit,
wherein the function hierarchically includes at least one set item which is referred to when executing the function, the at least one set item including a plurality of set values settable,
wherein the registration unit registers different fingerprints in association with the plurality of set values of the at least one set item, respectively,
wherein the registration unit allows registration of a same fingerprint in association with the function and the at least one set item hierarchically included in the function and the at least one set item is registerable by the registration unit with the same fingerprint,
wherein when a plurality of fingerprints are read sequentially by the read unit, the call unit sequentially reads at least one of the function, set item and set value associated with each of the fingerprints, and
when the instruct unit instructs the execution, the execute unit executes an operation based on at least one of the function, set item and set value read until the instruction is given by the instruct unit.

25. A multifunction apparatus system comprising:
a multifunction apparatus; and
a terminal apparatus connected to the multifunction apparatus via a network,
wherein the terminal apparatus comprises:
a terminal apparatus read unit that reads a fingerprint; and
   a registration unit that registers code information in association with the fingerprint read by the terminal apparatus read unit,
wherein the multifunction apparatus comprises:
   an information acquire unit that acquires registration contents registered by the registration unit from the terminal apparatus;
   a read unit that reads the fingerprint;
   a designation unit that designates one code information;
   a first storage unit that allocates the code information contained in the registration contents acquired by the information acquire unit;
   a second storage unit that stores the code information contained in the registration contents in association with at least one of a function of the multifunction apparatus, a set value of a set item, which is referred to when executing the function, and a fingerprint corresponding to the code information, the second storage unit storing the code information and the fingerprints;
   a call unit that calls the code information associated with the fingerprint from the first storage unit, the call unit reading the function or the set value of the set item corresponding to the code information from the second storage unit; and
   an execute unit that executes an operation based on the function or the set value of the set item corresponding to the code information read by the call unit,
wherein the function hierarchically includes at least one set item which is referred to when executing the function, the at least one set item including a plurality of set values,
wherein the second storage unit allocates and stores different code information in association with the plurality of set values of the at least one set item, respectively, and
wherein the registration unit allows registration of a same fingerprint in association with different code information and the at least one set item is registerable by the registration unit with the same fingerprint.

26. A non-transitory computer-readable medium having computer-executable instructions that, when executed, cause a computer to perform predetermined operations comprising:
acquiring a fingerprint;
designating one of a function, a set item and a set value, wherein the set item and the set value are referred to when executing the function;
referring to a storage unit;
registering, in the storage unit, one fingerprint read by the read unit and one of the function, the set item and the set value designated by the designate unit in association with each other; reading the function or the set value of the set item associated with the fingerprint acquired in the acquiring step;
detecting an execute instruction of an operation based on the function or the set value of the set item read in the reading step; and
executing the operation,
wherein the function hierarchically includes at least one set item which is referred to when executing the function, the at least one set item including a plurality of set values settable,
wherein registering includes registering different fingerprints in association with the plurality of set values of the at least one set item, respectively,
wherein registering includes registering of a same fingerprint in association with the function and the at least one set item hierarchically included in the function, and includes registering the same fingerprint in association with the at least one set item,
wherein when a plurality of fingerprints are read sequentially by the acquiring step, reading in the reading step at least one of the function, set item and set value associated with each of the fingerprints, and
when the execute instruction is detected in the detecting step, the operation based on at least one of the thus read function, set item and set value is executed in the executing step.

27. The non-transitory computer-readable medium according to claim 26, wherein the predetermined operations further including the steps of:
detecting that one of the function, the set item and the set value is designated; and
registering the fingerprint acquired in the acquiring step and the function, the set item or the set value detected in the detecting step in association with each other.

28. A non-transitory computer-readable medium having computer-executable instructions that, when executed, cause a computer to perform predetermined operations comprising:
acquiring a fingerprint;
designating one code information;
referring to a first storage unit the acquired one fingerprint and one code information in association with the one fingerprint and a second storage unit for allocating the code information in association with a function of the multifunction apparatus or a set value of a set item that is referred to when executing the function;

storing the function or the set value of the set item and the code information;

reading the code information associated with the fingerprint acquired in the acquiring step from the first storage unit and the function or the set value of the set item corresponding to the code information from the second storage unit;

detecting an execute instruction of an operation based on the function or the set value of the set item read in the reading step; and executing the operation, wherein when the execute instruction is detected in the detecting step, the operation based on the function or the set value of the set item read until the detection is made in the detecting step, wherein the function hierarchically includes at least one set item which is referred to when executing the function, the at least one set item including a plurality of set values, wherein registering in the second storage unit allocates and stores different code information in association with the plurality of set values of the at least one set item, respectively, and wherein the registration step allows registration of a same fingerprint in association with different code information and allows registration of the same fingerprint in association with the at least one set item.

29. The non-transitory computer-readable medium according to claim 28, wherein the predetermined operations further including the steps of:

detecting that one of the code information is designated; and registering the fingerprint acquired in the acquiring step and the code information detected in the detecting step in the first storage unit in association with each other.

* * * * *